US005737504A

United States Patent [19]

Yamada

[11] Patent Number: 5,737,504

[45] Date of Patent: Apr. 7, 1998

[54] LABEL PRINTER

[75] Inventor: Keisuke Yamada, Saitama-ken, Japan

[73] Assignee: Kabushiki Kaisha Sato, Japan

[21] Appl. No.: 575,891

[22] Filed: Dec. 19, 1995

[30] Foreign Application Priority Data

Dec. 21, 1994 [JP] Japan .................................... 6-335625

[51] Int. Cl.[6] .................................................. G06K 15/00

[52] U.S. Cl. ............................................ 395/117; 395/112

[58] Field of Search .................................... 395/101, 112, 395/117, 113, 349, 348, 927, 961; 364/464.24; 177/4–5, 15; 399/82; 345/173, 174–178

[56] References Cited

U.S. PATENT DOCUMENTS

| | | | |
|---|---|---|---|
| 4,928,229 | 5/1990 | Teraoka et al. | 364/464.01 |
| 5,045,880 | 9/1991 | Evanitsky et al. | 355/200 |
| 5,326,270 | 7/1994 | Ostby et al. | 434/362 |

*Primary Examiner*—Arthur G. Evans

*Attorney, Agent, or Firm*—Ostrolenk, Faber, Gerb & Soffen, LLP

[57] ABSTRACT

A label printer having a system unit in which price or other such print data is printed on labels. The label printer includes a touch-screen device by which print data setting information to be entered by a hierarchical system of operation screens displayed on the touch-screen may be entered at any desired level in the operating screen hierarchy. Thus, the label printer provides simplified and quick label printout operations by eliminating the need to repeat the input of print data that has already been input. In the label printer of the print data setting information sets the prescribed content of the data to be printed on a label, and print data editing information determines where the data is to be printed on the label and in what format. The print data setting information and the print data editing information are entered by a hierarchy of operating screens displayed in sequence on a touch-screen provided on the label printer system unit. Any desired operation screen in the hierarchy can be displayed on the touch-screen and print data setting information is inputted from that level.

16 Claims, 33 Drawing Sheets

Print data parameter space

| Data No | Name parameter setting space | Attribute field | Number of digits field | Type field | Initial data value parameter setting space |
|---|---|---|---|---|---|
| 01 | Product name | Input | 06 | Kanji | Chocolate |
| 02 | Flag manufacturer | Fixed | 07 | Number | 4912345 |
| 03 | Product code | Input | 05 | Number | 67890 |
| 3 | | | | | |

39 49 48 47 41 46 42 44 44

Fig.9

(SCREEN 1) UTILITY MODE SCREEN (SCREEN 2) Print parameter setting screen (SCREEN 3) PARAMETER SETTING SCREEN (SCREEN 4) FORMAT NUMBER ENTRY SCREEN (SCREEN 5) DATA NUMBER ENTRY SCREEN (SCREEN 6) NAME ENTRY SCREEN (SCREEN 7) DATA ATTRIBUTE INPUT SCREEN (SCREEN 8) NUMBER OF DATA DIGITS ENTRY SCREEN (SCREEN 9) DATA TYPE ENTRY SCREEN (SCREEN 10) INITIAL PRINT DATA VALUE ENTRY SCREEN (SCREEN 11) SELECT PRINT DATA ENTRY SCREEN (SCREEN 12) POST-PRINT DATA CLEAR OPTION SCREEN (SCREEN 13) FINAL FIELD CONFIRMATION SCREEN (SCREEN 14) DESTINATION NUMBER SETTING SCREEN (SCREEN 15) FIELD PARAMETER SETTING SCREEN (SCREEN 16) FIELD NUMBER SETTING SCREEN (SCREEN 17) INITIAL FIELD PARAMETER SETTING SCREEN (SCREEN 18) CHARACTER FIELD SETTING SCREEN

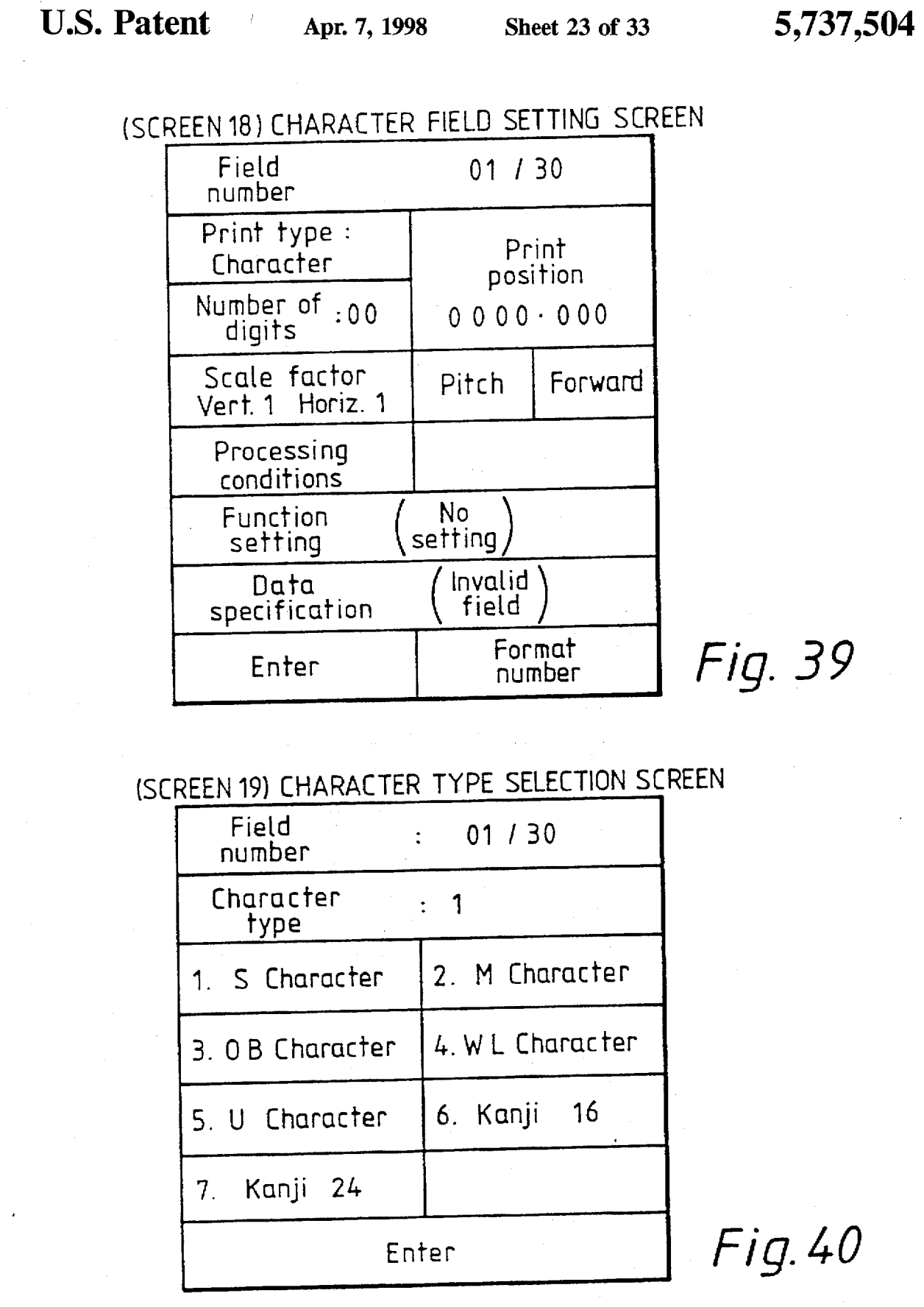

| | | |
|---|---|---|
| Field number | 01 / 30 | |
| Print type : Character | Print position 0 0 0 0 · 0 0 0 | |
| Number of digits :00 | | |
| Scale factor Vert. 1 Horiz. 1 | Pitch | Forward |
| Processing conditions | | |
| Function setting (No setting) | | |
| Data specification (Invalid field) | | |
| Enter | Format number | |

*Fig. 39*

(SCREEN 19) CHARACTER TYPE SELECTION SCREEN

| | |
|---|---|
| Field number : 01 / 30 | |
| Character type : 1 | |
| 1. S Character | 2. M Character |
| 3. O B Character | 4. W L Character |
| 5. U Character | 6. Kanji 16 |
| 7. Kanji 24 | |
| Enter | |

*Fig. 40*

(SCREEN 20) PRINT POSITION ENTRY SCREEN (SCREEN 21) NUMBER OF PRINT DATA DIGITS ENTRY SCREEN (SCREEN 22) PITCH ENTRY SCREEN (SCREEN 23) CHARACTER SCALE FACTOR ENTRY SCREEN (SCREEN 24) PRINT DIRECTION ENTRY SCREEN (SCREEN 25) DATA SPECIFICATION SELECTION SCREEN (SCREEN 26) DATA BLOCK SETTING SCREEN

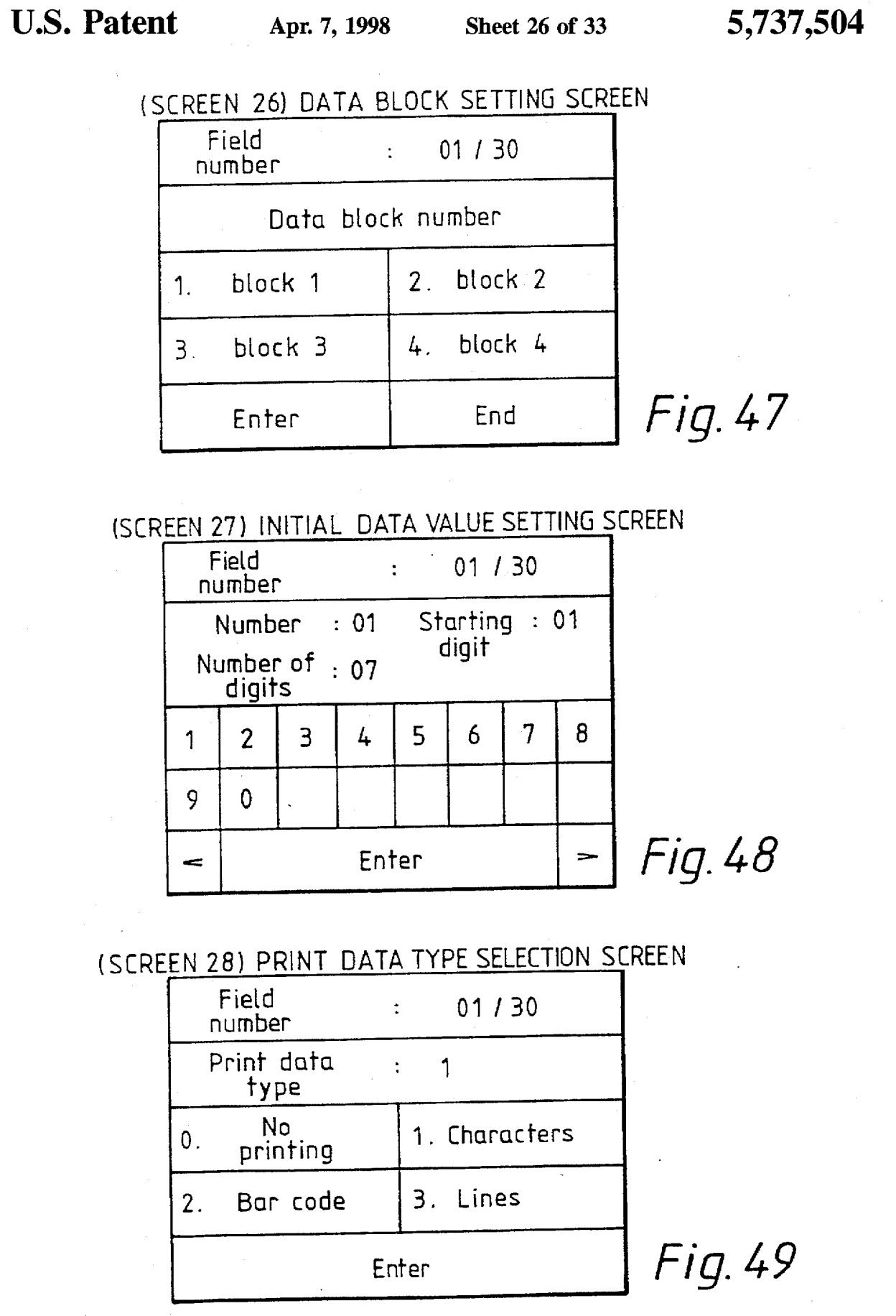

| | |
|---|---|
| Field number : 01 / 30 | |
| Data block number | |
| 1. block 1 | 2. block 2 |
| 3. block 3 | 4. block 4 |
| Enter | End |

Fig. 47

(SCREEN 27) INITIAL DATA VALUE SETTING SCREEN

| | | | | | | | |
|---|---|---|---|---|---|---|---|
| Field number : 01 / 30 | | | | | | | |
| Number : 01 Number of digits : 07 | | | | Starting digit : 01 | | | |
| 1 | 2 | 3 | 4 | 5 | 6 | 7 | 8 |
| 9 | 0 | . | | | | | |
| < | Enter | | | | | | > |

Fig. 48

(SCREEN 28) PRINT DATA TYPE SELECTION SCREEN

| | |
|---|---|
| Field number : 01 / 30 | |
| Print data type : 1 | |
| 0. No printing | 1. Characters |
| 2. Bar code | 3. Lines |
| Enter | |

Fig. 49

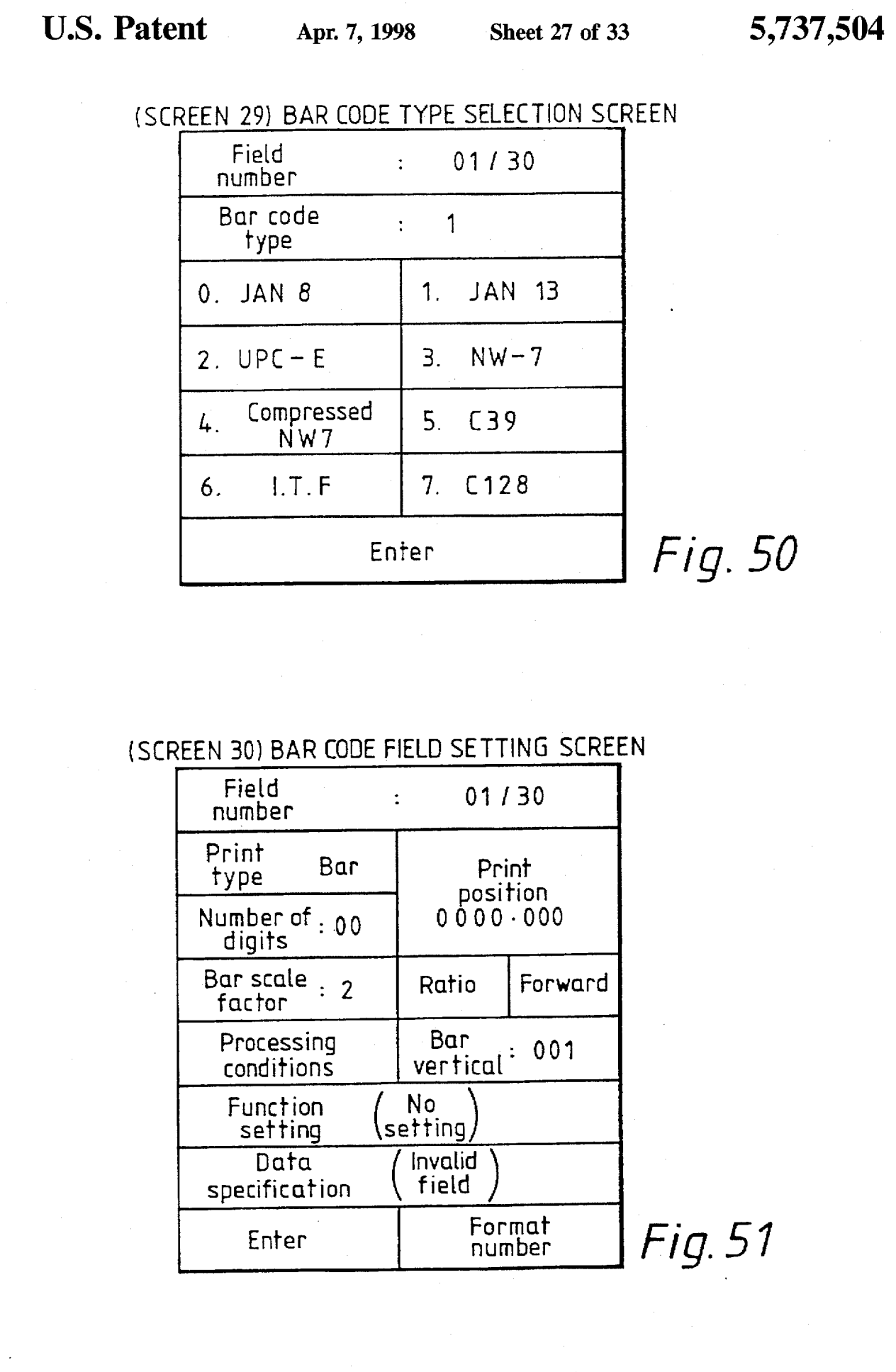

(SCREEN 29) BAR CODE TYPE SELECTION SCREEN

| | |
|---|---|
| Field number | : 01 / 30 |
| Bar code type | : 1 |
| 0. JAN 8 | 1. JAN 13 |
| 2. UPC-E | 3. NW-7 |
| 4. Compressed NW7 | 5. C39 |
| 6. I.T.F | 7. C128 |
| Enter | |

Fig. 50

(SCREEN 30) BAR CODE FIELD SETTING SCREEN

| | | |
|---|---|---|
| Field number | : 01 / 30 | |
| Print type Bar | Print position 0000·000 | |
| Number of digits : 00 | | |
| Bar scale factor : 2 | Ratio | Forward |
| Processing conditions | Bar vertical : 001 | |
| Function setting (No setting) | | |
| Data specification (Invalid field) | | |
| Enter | Format number | |

Fig. 51

(SCREEN 31) BAR CODE SCALE FACTOR SCREEN (SCREEN 32) BAR CODE RATIO SCREEN (SCREEN 33) BAR CODE VERTICAL SCREEN (SCREEN 34) PROCESSING CONDITION SETTING SCREEN

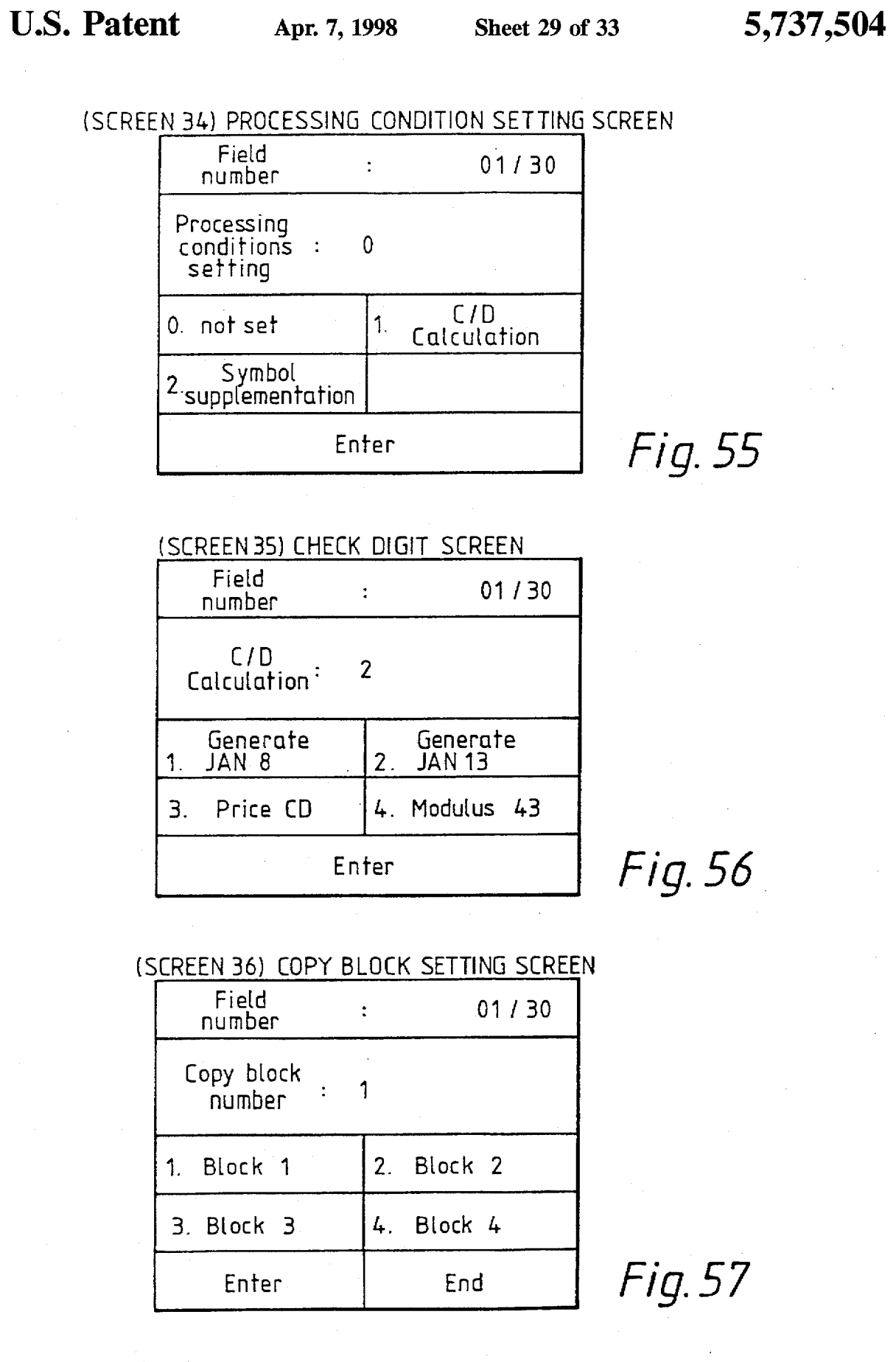

| | |
|---|---|
| Field number : | 01 / 30 |
| Processing conditions setting : 0 | |
| 0. not set | 1. C/D Calculation |
| 2. Symbol supplementation | |
| Enter | |

Fig. 55

(SCREEN 35) CHECK DIGIT SCREEN

| | |
|---|---|
| Field number : | 01 / 30 |
| C/D Calculation : 2 | |
| 1. Generate JAN 8 | 2. Generate JAN 13 |
| 3. Price CD | 4. Modulus 43 |
| Enter | |

Fig. 56

(SCREEN 36) COPY BLOCK SETTING SCREEN

| | |
|---|---|
| Field number : | 01 / 30 |
| Copy block number : 1 | |
| 1. Block 1 | 2. Block 2 |
| 3. Block 3 | 4. Block 4 |
| Enter | End |

Fig. 57

(SCREEN 37) PRINT MODE SELECTION SCREEN (SCREEN 38) PRINT SELECTION SCREEN (SCREEN 39) MANUAL ENTRY SCREEN (SCREEN 40) INITIAL DATA VALUE DISPLAY SCREEN (SCREEN 41) NAME SELECTION SCREEN (SCREEN 42) INITIAL DATA VALUE DISPLAY SCREEN (SCREEN 43) MANUAL ENTRY PRINTOUT SCREEN (SCREEN 44) PRINTOUT CONFIRMATION SCREEN (SCREEN 42) INITIAL DATA VALUE DISPLAY SCREEN

LABEL PRINTER

BACKGROUND OF THE INVENTION

1. Field of the Invention

The present invention relates to an improved label printer.

2. Description of the Prior Art

FIG. 67 shows the arrangement of a conventional label printer 1 for printing data such as price and the like on a label in the form of a bar code. As shown, the label printer 1 comprises a label strip 3 in the form of a roll that is mounted in a printer system unit 2, from which the label strip 3 is transported between a thermal print head 4 and a platen roller 5 to print prices, bar codes and other such data on labels 6.

In the above conventional configuration, the printer system unit 2 is provided with a keyboard 7 as the means of entering print data into the label printer 1. To confirm the print data inputted by the keyboard 7, the printer system unit 2 is provided with a liquid-crystal display (LCD) 8 on which data entered by the keyboard 7 is displayed.

Prices, product codes and other such print data entered into the label printer 1 via the keyboard 7, are keyed in as an integral combination of media parameters comprised of print data setting information that specifies the required contents of the print data, and print data editing information such as positional data indicating where the print data is to be printed on the label, the size of the print, rotation direction, whether it is printed in bar code form or as ordinary characters (human-readable characters).

However, a drawback of the above conventional label printer 1 is that the operation screens used for entering the media parameters are always displayed in a set sequence. This has adverse affect on print data input efficiency, since there are many media parameters to be set, and the setting procedure is complex.

SUMMARY OF THE INVENTION

An object of the present invention is therefore to provide a label printer in which print setting information specifying the required contents of label print data, and editing information for printing the above print data in a required format on the label, can be entered using operating screens displayed on a touch screen device in the form of a sequential hierarchical structure. The hierarchical structure whereby the operating screens are displayed on the touch-screen is arranged so that any desired level in the hierarchy can be displayed and print setting information inputted from that level.

In accordance with the present invention, the above object is attained by a label printer, in which print setting information specifying the required contents of label print data, and editing information for printing the print setting information in a required format on the label, can be entered using operating screens displayed on a touch screen device in the form of a sequential hierarchical structure. The hierarchical structure whereby the operating screens are displayed on the touch-screen is arranged so that any desired level in the hierarchy can be displayed and print setting information inputted from that level.

In the hierarchical structure used to display operating screens on touch-screen, a desired level in the hierarchy is displayed and print setting information is inputted from that level.

BRIEF DESCRIPTION OF THE DRAWINGS

FIG. 9 shows the arrangement of the print data parameters of the label of the invention shown in FIG. 10.

FIG. 39 shows a character field setting screen on the touch-screen unit of the invention.

FIG. 40 shows a character type selection screen on the touch-screen unit of the invention.

FIG. 47 shows a data block setting screen on the touch-screen unit of the invention.

FIG. 48 shows an initial data value setting screen on the touch-screen unit of the invention.

FIG. 49 shows a print data type selection screen on the touch-screen unit of the invention.

FIG. 50 shows a bar code type selection screen on the touch-screen unit of the invention.

FIG. 51 shows a bar code field setting screen on the touch-screen unit of the invention.

FIG. 55 shows a processing condition setting screen on the touch-screen unit of the invention.

FIG. 56 shows a check digit screen on the touch-screen unit of the invention.

FIG. 57 shows a copy block setting screen on the touch-screen unit of the invention.

DESCRIPTION OF THE PREFERRED EMBODIMENTS

All embodiment of the present invention will now be described with reference to the drawings.

Figure 1:
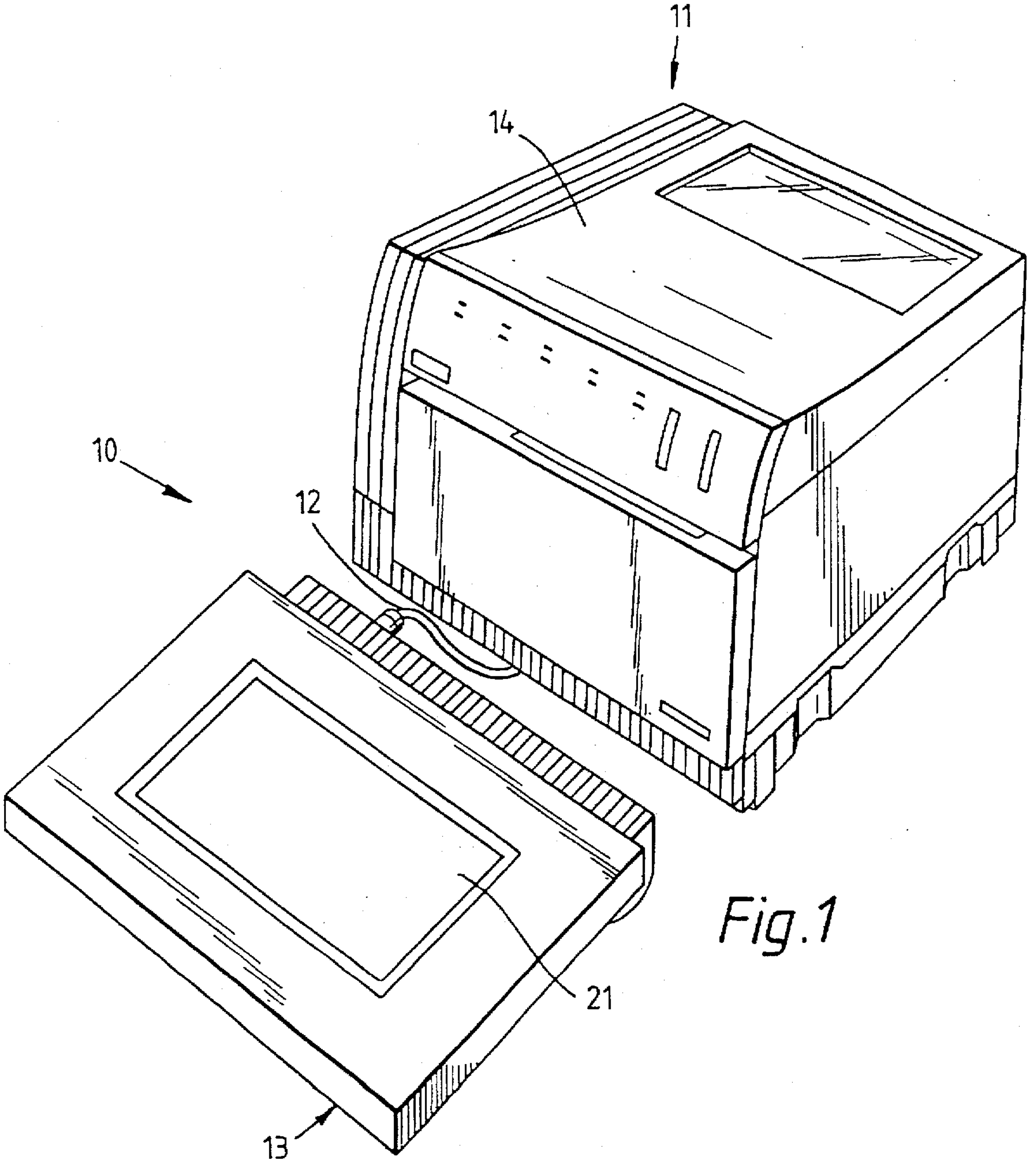
FIG. 1 is an external perspective view of the label printer of the invention.

FIG. 1 is a perspective view showing the exterior of one embodiment of a label printer 10 according to the present invention. The label printer 1O comprises a label printer system unit 11 and a touch-screen unit 13 connected with the printer system unit 11 by an interface cable 12.

Figure 2:
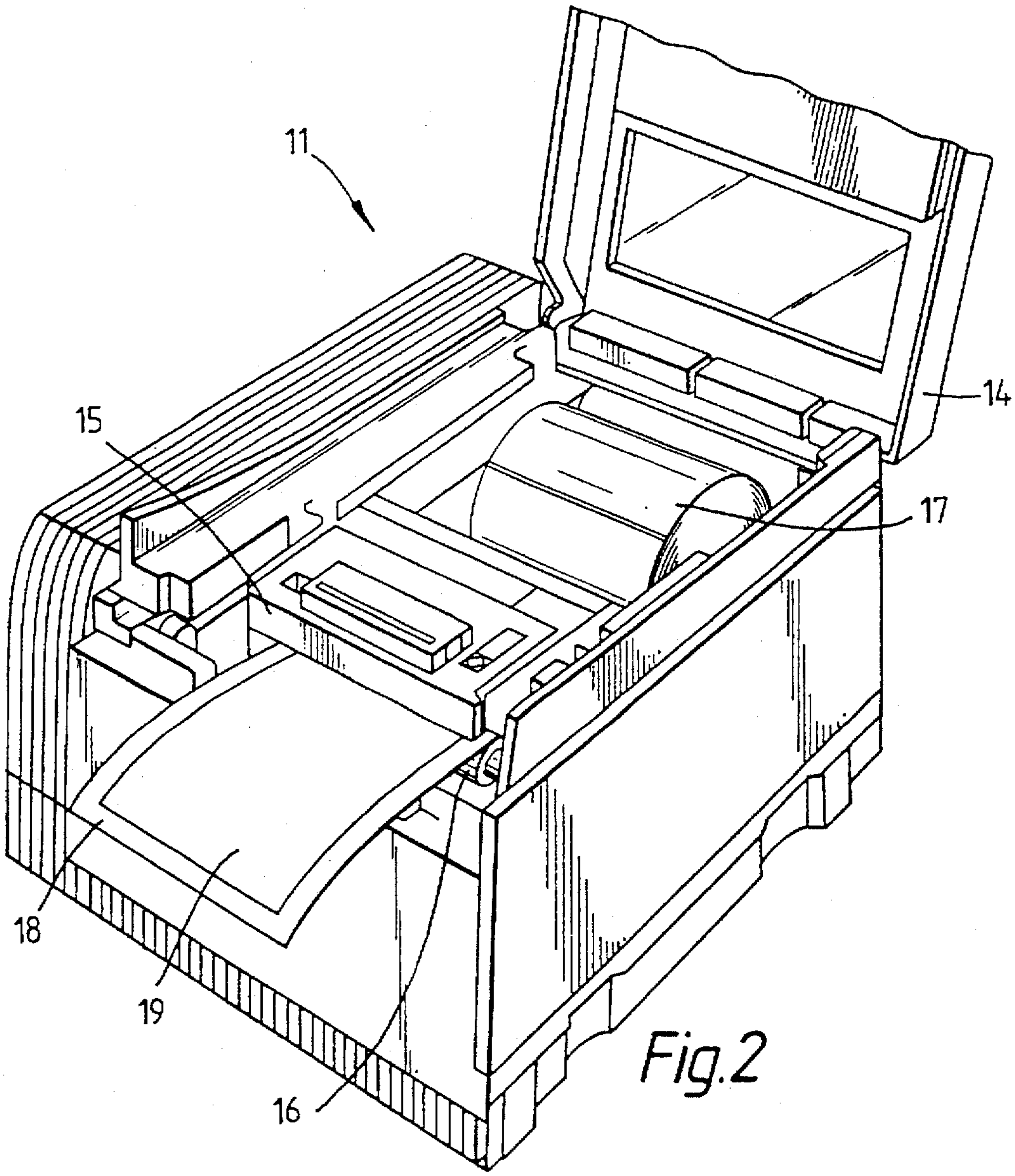
FIG. 2 is a perspective view of the label printer of the invention with the cover open to show the main parts.

FIG. 2 shows the printer system unit 11 with its cover 14 open. Inside the printer system unit 11 are a thermal print head 15 and a platen roller 16, which operate together to effect printing.

Reference numeral 17 denotes a roll of label strip 17 rotatably mounted toward the rear of the printer system unit 11. The label strip 17 comprises thermosensitive labels 19 detachably attached to a backing strip 18. The label strip 17 is fed between the thermal print head 15 and the platen roller 16, where the prescribed printing of the label 19 is effected by heat supplied from the thermal print head 15.

Figure 3:
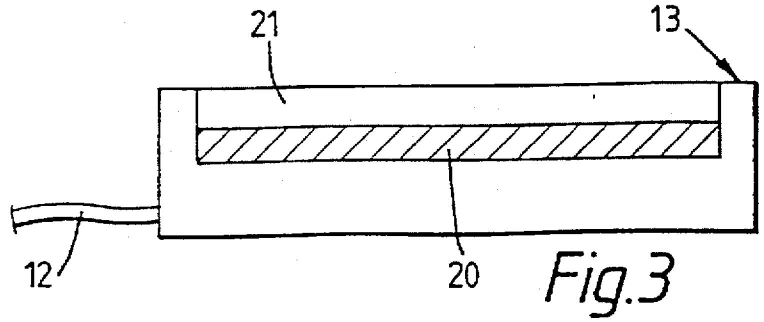
FIG. 3 is a cross-sectional view of the touch-screen unit of the invention.

As shown in FIG. 3, the touch-screen unit 13 has an LCD 20 for displaying operating screens, and a transparent touch-panel 21 set in close contact with the surface of the LCD 20. When an operator uses a finger to touch a point on the touch-panel 21, the location of the point thus touched is detected by a Central Processing Unit (hereinafter reffered to as CPU 22) as X and Y coordinates of the touch-panel 21.

Figure 4:
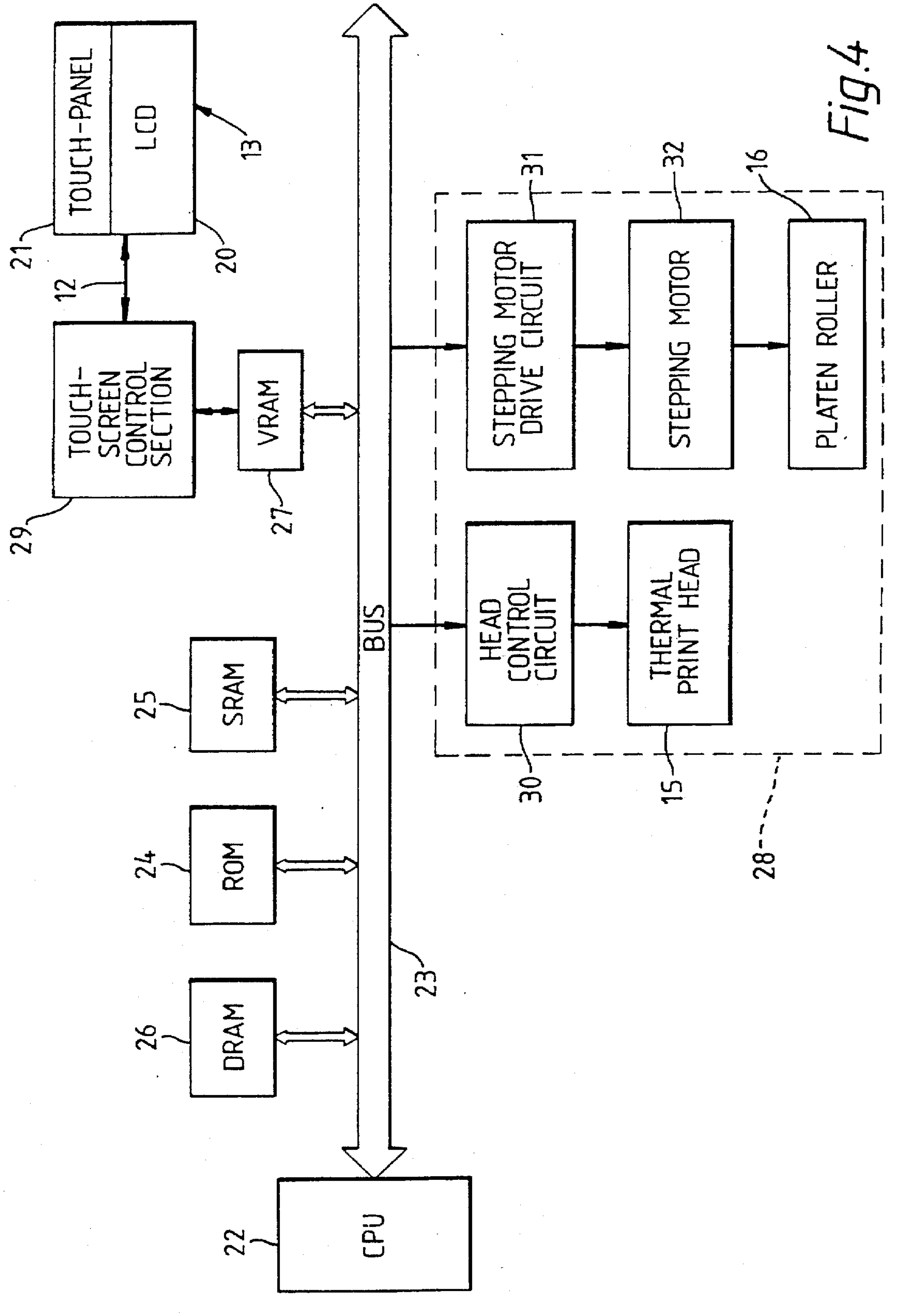
FIG. 4 is a block diagram of the electrical circuit of the invention.

FIG. 4 is a block diagram of the electrical circuit of the label printer 10. A bus 23 is used to connect a read-only memory (hereinafter referred to as "ROM 24") , a first memory constituted by a static random-access memory (hereinafter referred to as "SRAM 25"), a second memory constituted by a dynamic random-access memory (hereinafter referred to as "DRAM 26"), a video RAM (hereinafter referred to as "VRAM 27") and a printer section 28 to a "CPU 22". A touch-screen control section 29 is connected to the VRAM 27, and the interface cable 12 connects the touch-screen control section 29 to the touch-screen unit 13.

The printer section 28 is comprised of a head control circuit 30 connected to the bus 23, the thermal print head 15, which is connected to the head control circuit 30, a stepping motor drive circuit 31 connected to the bus 23, a stepping motor 32 connected to the stepping motor drive circuit 31, and the platen roller 16, which is connected to the stepping motor 32.

The ROM 24 contains an MS-DOS (registered trademark) operating system which is, a program that provides overall control of the label printer 10 by controlling the touch-screen unit 13, the SRAM 25, the DRAM 26, and so forth, and the various operating screen data hierarchically displayed on the LCD 20 of the touch-screen unit 13.

The SRAM 25 is used for storing various data, such as print data, print data parameters, print data editing parameters and the like.

Most of the DRAM 26 is taken up by an operation work area 26*b*. Label 19 print data and the like supplied to the thermal print head 15 is developed in the form of a dot image under the control of the CPU 22.

Figure 5:
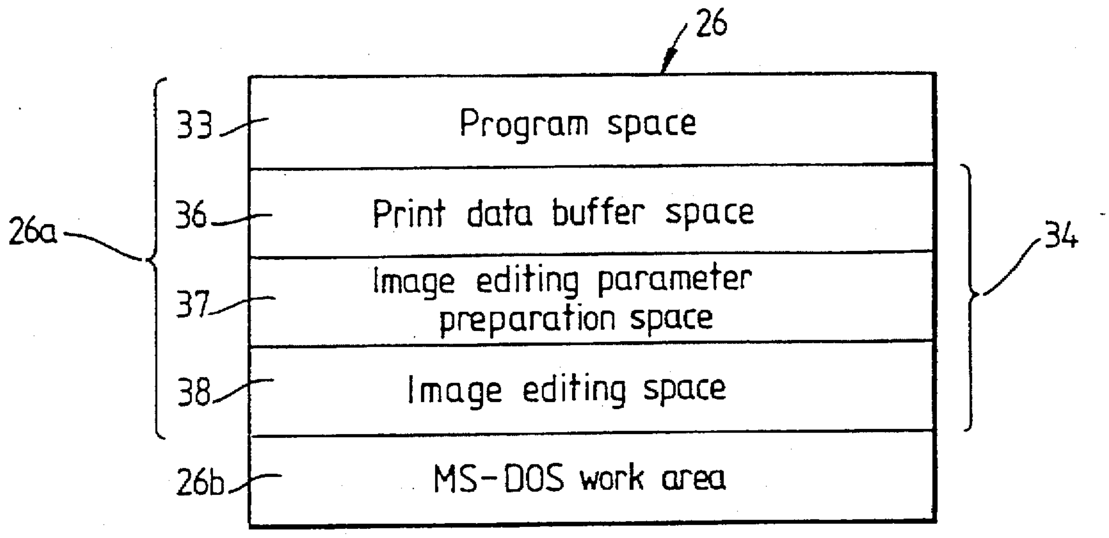
FIG. 5 shows the arrangement of the DRAM of the invention.

As shown in FIG. 5, DRAM 26 has an operation work area 26*a* and the MS-DOS operation work area 26*b*, with the operation work area 26*a* consisting of program space 33 and operation memory space 34. Program space 33 is used for processing data read into operation memory space 34 by a prescribed program, and for holding the code for a jump table 35 described below. More specifically, the operation memory space 34 consists of a print data buffer space 36, an image editing parameter preparation space 37 and an image editing space 38. The print data buffer space 36 is used for holding the initial values of print data parameters (described below) held in SRAM 25, as set in the initial data value parameter setting space 39; these parameters are converted into print data form for this storage in the buffer space 36. Print data contained in the buffer space 36 and print data editing parameters held in SRAM 25 are read into image editing parameter preparation space 37, where the print data is developed in accordance with conditions specified by the print data editing parameters to produce image editing parameters. Image editing parameters produced in the image editing parameter preparation space 37 are read into image editing space 38, where print image data is produced in accordance with these image editing parameters. The above print image data is the same as the price, product code and such other specific print data to be printed on labels 19, developed into image form.

The MS-DOS program stored in the ROM 24 is read into operation work area 26*b*, where a data field parameter file 40, described below, is produced.

Under the control of the CPU 22, operation screen data stored in ROM 24 is developed into operation screen image data in VRAM 27. By the touch-screen control section 29, this image data is displayed on the LCD 20 of the touch-screen unit 13 as sequences of operation screens.

Under the control of CPU 22, print data stored in SRAM 25 is moved to DRAM 26, and is also supplied to thermal print head 15 via the head control circuit 30.

The CPU 22 also controls the supply of the above print data to the thermal print head 15, and operates the stepping motor 32 via the stepping motor drive circuit 31 to thereby turn the platen roller 16 and print the data on labels 19 transported between the platen roller 16 and the thermal print head 15.

Figure 6:
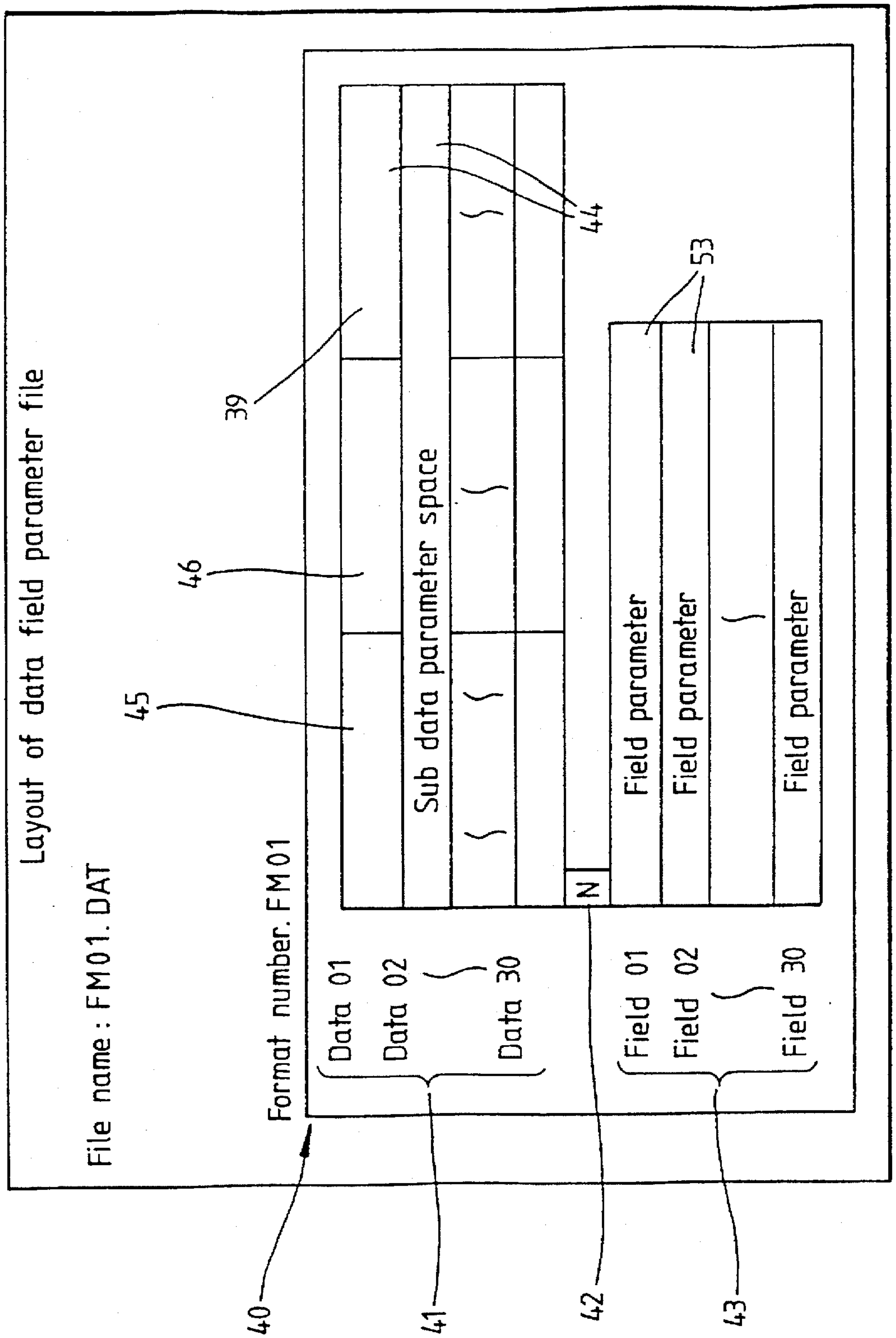
FIG. 6 shows the layout of the data field parameter file of the invention.

FIG. 6 shows the layout of the data field parameter file 40, which constitutes an essential part or this invention. The data field parameter file 40 has a print data parameter space 41 for setting print data information in the form of print data parameters, a destination number setting space 42 for setting the destination number N that designates the hierarchical level of the operation screen displayed when the next print data is input from the touch-screen unit 13, and a print field parameter space 43 for setting print data editing information in the form of print data field parameters.

The data field parameter file 40 is stored in the SRAM 25 with an MS-DOS file name FMxx.DAT (where xx has a valid value of 01–99). Format number FM01 data field parameter file 40 designates a data field parameter file 40 named FM01.DAT.

This format number FM01 makes it possible to differentiate one data field parameter file 40 (FM01.DAT) comprised of a print data parameter, a corresponding print field parameter and a destination number N from other data field parameter files 40 (FM02.DAT–FM99.DAT).

The data field parameter files 40 FM01.DAT to FM99.DAT are formed having format numbers FM01 to FM99. FIG. 6 shows only the file having the format number FM01. Since the composition of each of the data field parameter files 40 having format numbers FM02 to FM99 is the same as that of file format number FM01, description of the other files is omitted.

The print data parameter space 41 has sub data parameter spaces 44 designated by data numbers 01 to 30. Each of these sub data parameter spaces 44 has the same composition, which includes a data parameter setting space 45 for a prescribed byte for setting parameter designating print data properties and the like, a name parameter setting space 46 for a prescribed byte for setting a name parameter designating an entry indicating print data content, and the initial data value parameter setting space 39 for a prescribed byte for setting an initial print data value parameter that sets the initial print data value (the default value).

Figure 7:
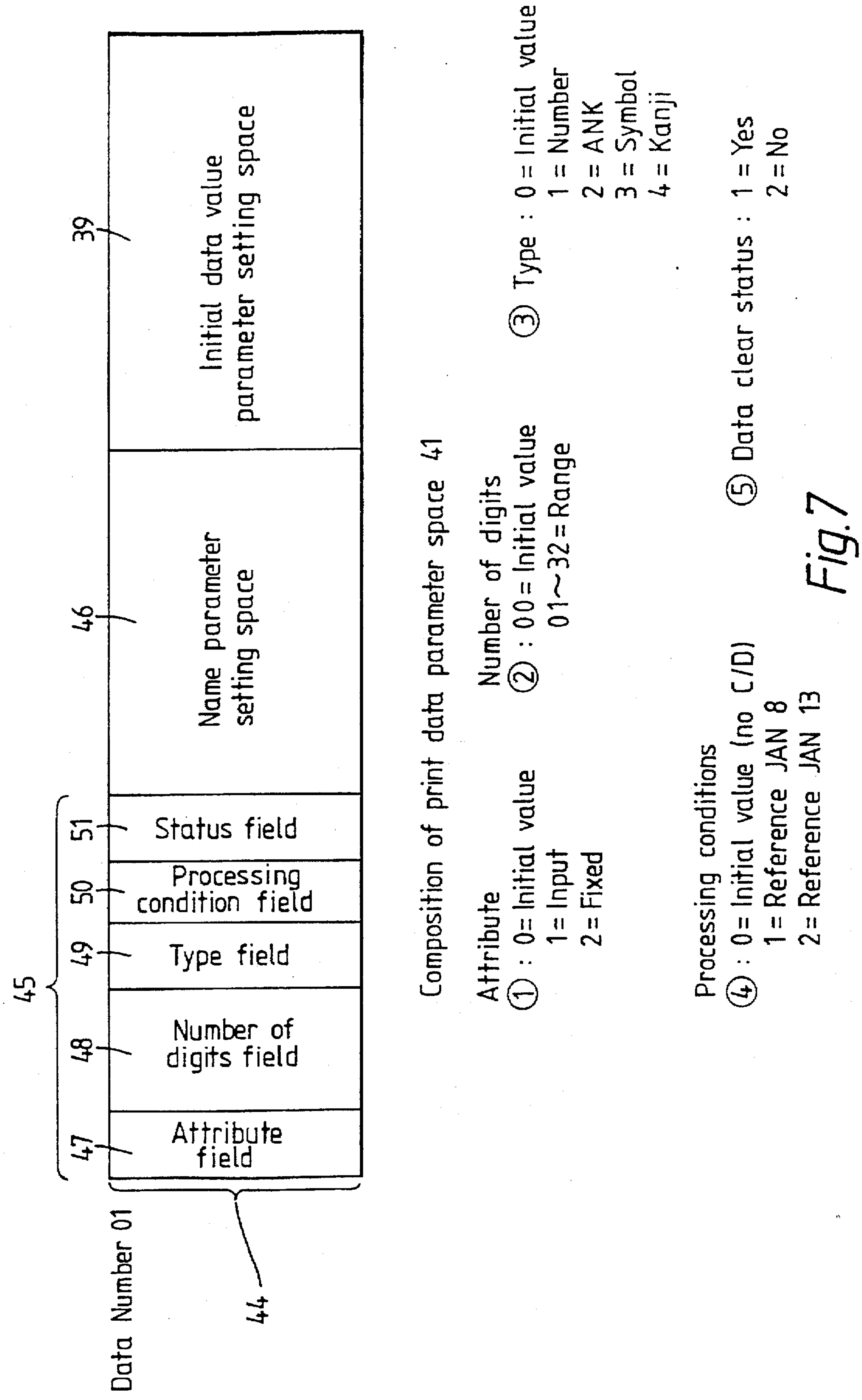
FIG. 7 shows the arrangement of the sub data parameter spaces of the invention.

FIG. 7 shows details of the sub data parameter space 44 of data number 01.

Each sub data parameter space 44 includes a data parameter setting space 45, a name parameter setting space 46 and an initial data value parameter setting space 39. Data parameter setting space 45 is further divided into an attribute field 47, a number of digits field 48, a type field 49, a processing condition field 50 and a status field 51.

When labels 19 are being printed out, the attribute field 47 is used for setting a parameter that determines whether a change mode is to be used because new print data has been entered via the touch-screen unit 13, or a fixed mode to again use the print data just used. Either of these modes can be selected by setting a prescribed numerical value in the attribute field 47.

The number of digits field 48 is for setting a parameter determining the maximum number of digits of the initial data value parameter set in the initial data value parameter setting space 39.

The type field 49 is for setting a parameter that determines whether the parameter set in the initial data value parameter setting space 39 is a number, ANK, symbol or kanji.

When the initial data value parameter is a bar code, the processing condition field 50 sets a mode parameter that determines whether the value of a check digit input from the touch-screen unit 13 is positive or negative is to be judged automatically or not, and when judgement is automatic, determines the bar code, for example JAN 8 or JAN. 13.

When a label 19 is printed out, the status field 51 sets a parameter that determines whether the print data of that label 19 is kept as the print data for the next label 19, or whether that print data is cleared and the print data used for the label immediately preceding the printed out label 19 is used for the next label 19.

The name parameter setting space 46 sets the parameter designating the entry that indicates the content of the data to be printed, such as for example date of manufacture, product category name, manufacturer, product code, and the like. This is displayed when the operator uses the touch-screen unit 13 to enter the print data, and makes it easier to understand what to enter to produce the requisite print data.

The initial data value parameter setting space 39 sets an initial value (default value) parameter for the data to be printed on a label 19, which may be a date of manufacture (such as 10 Oct. 1994), a product name (such as chocolate or the like), and the vendor (such as the ABC Store). The contents may be set as desired, but must be within the maximum number of digits set for the number of digits field 48.

Figure 8:
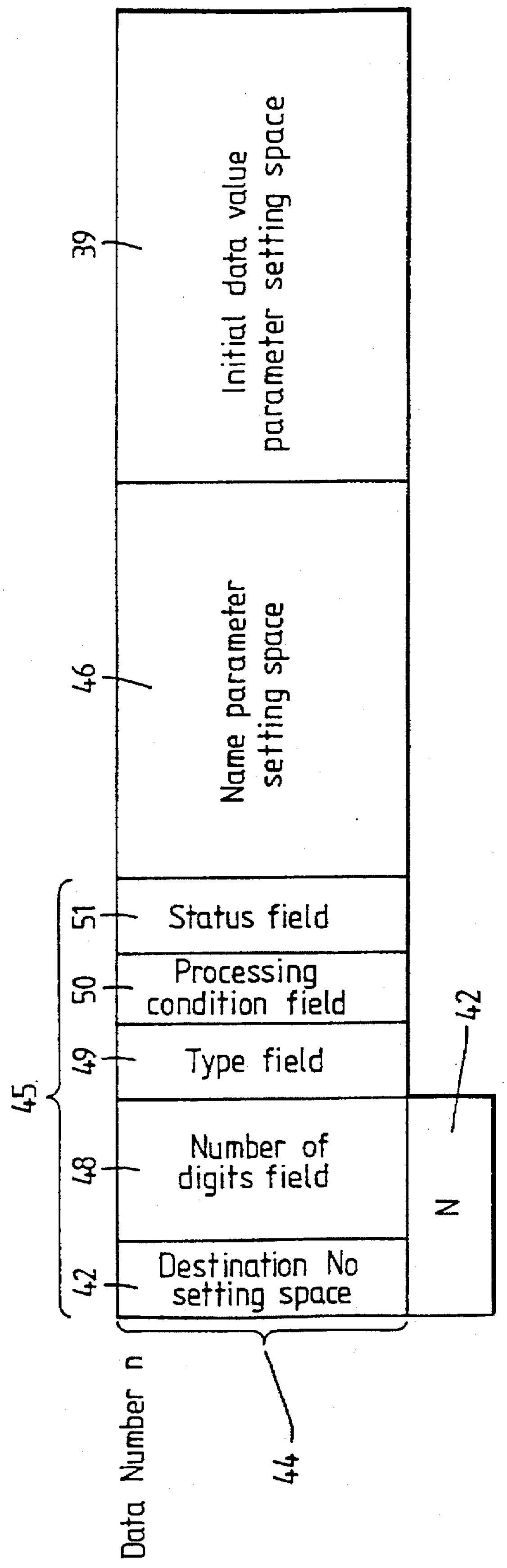
FIG. 8 shows the arrangement of the sub data parameter space having the final data number, according to the invention.

FIG. 8 shows the sub data parameter space 44 of the final data number n (n=1–30) of the print data parameter space 41. The destination number setting space 42 is formed below the sub data parameter space 44. The destination number N set in the destination number setting space. 42 may be any sub data parameter space 44 data number from 01 to 30. In the label printing operation the operation screen to be displayed on the touch-screen unit 13, with initial data entry values from which to start data entry can be designated by these data numbers 01 to 30. Following such designation which the subsequent display of the operation screens proceeds from that point in the hierarchy, thereby enabling entry of the print data to proceed from that point.

Figure 10:
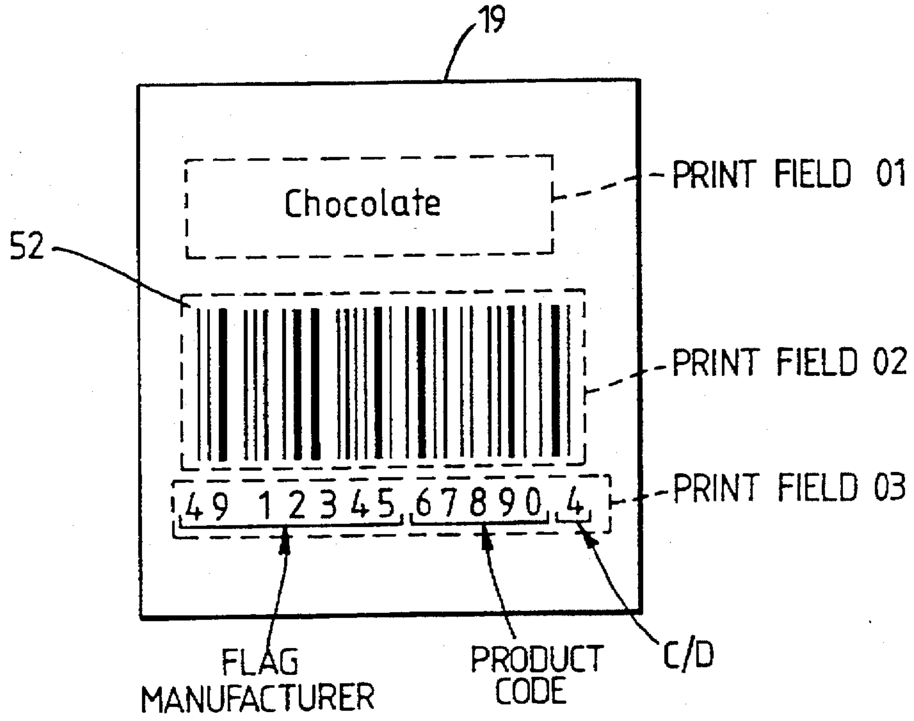
FIG. 10 is a front view of a label printed based on the initial print data values according to the invention.

FIG. 9 shows the settings used in the print data parameter space 41 to produce the data printed on the label 19 shown in FIG. 10. The label 19 shown in FIG. 10 has spaces (hereinafter referred to as "print fields") 01, 02 and 03 in which data in the form of numbers, characters, and bar codes is printed. In this example, "chocolate" is printed in print field 01, a bar code 52 is printed in print field 02, and explanatory characters are printed in print field 03. The word "chocolate" represents the name of the product, and the explanatory characters are a flag manufacturer code 4912345, a product code 67890, and a check digit 4.

In FIG. 9, the word "chocolate" is the initial print data parameter set in the initial data value parameter setting space 39 of the sub data parameter space 44 designated by data number 01. The name parameter designates product name, data attributed to entry mode, number of print data digits being 6 digits, and the data type.

The bar code data of bar code 52 includes the flag manufacturer code, the product code, and the check digit. The designation of this bar code data is found in data numbers 02 and 03 in the sub data parameter space 44. That is, the flag manufacturer code 4912345 is the parameter in the initial data value parameter setting space 39 of sub data parameter space 44 and is set in data number 02. The flag manufacturer is the name parameter set in the name parameter setting space 46. Moreover in the attribute field 47 the parameter is set to be fixed, in the number of digits field 48 the parameter is seven digits, and in the data type field 49 the parameter is number.

With reference to the explanatory characters 4912345678904 in the print field 03 of FIG. 10, a print field copy function, described below, is set so that this print data 4912345678904 is data copied from print field 02. Thus, there is no parameter setting in the sub data parameter space 44, shown in FIG. 9, that specifies the explanatory character print data.

The destination number in the destination number setting space 42 is 3. Thus, after a label has been printed out, the initial data input screen used for printing out a next label will be the screen for entering the manufacturer code, i.e., 67890, which is the print data indicated by the data number 03 in sub data parameter space 44.

Referring to FIG. 6, the print field parameter space 43 of the data field parameter file 40 subsequently described, with reference to print data editing information set therein.

Editing information relating to the format of data printed on a label 19 is determined in the form of parameter settings in the print field parameter space 43.

The print field parameter space 43 is divided into thirty sub print field parameter spaces 53, which are designated by field numbers 01 to 30. These field members 01 to 30 correspond to the spaces on each label 19 in which product name, price, manufacturer and other such data is to be printed.

Thus, the sub print field parameter space 53 designated by print field 01 contains a parameter relating to the print format in print field 01 of the label 19.

Figure 11:
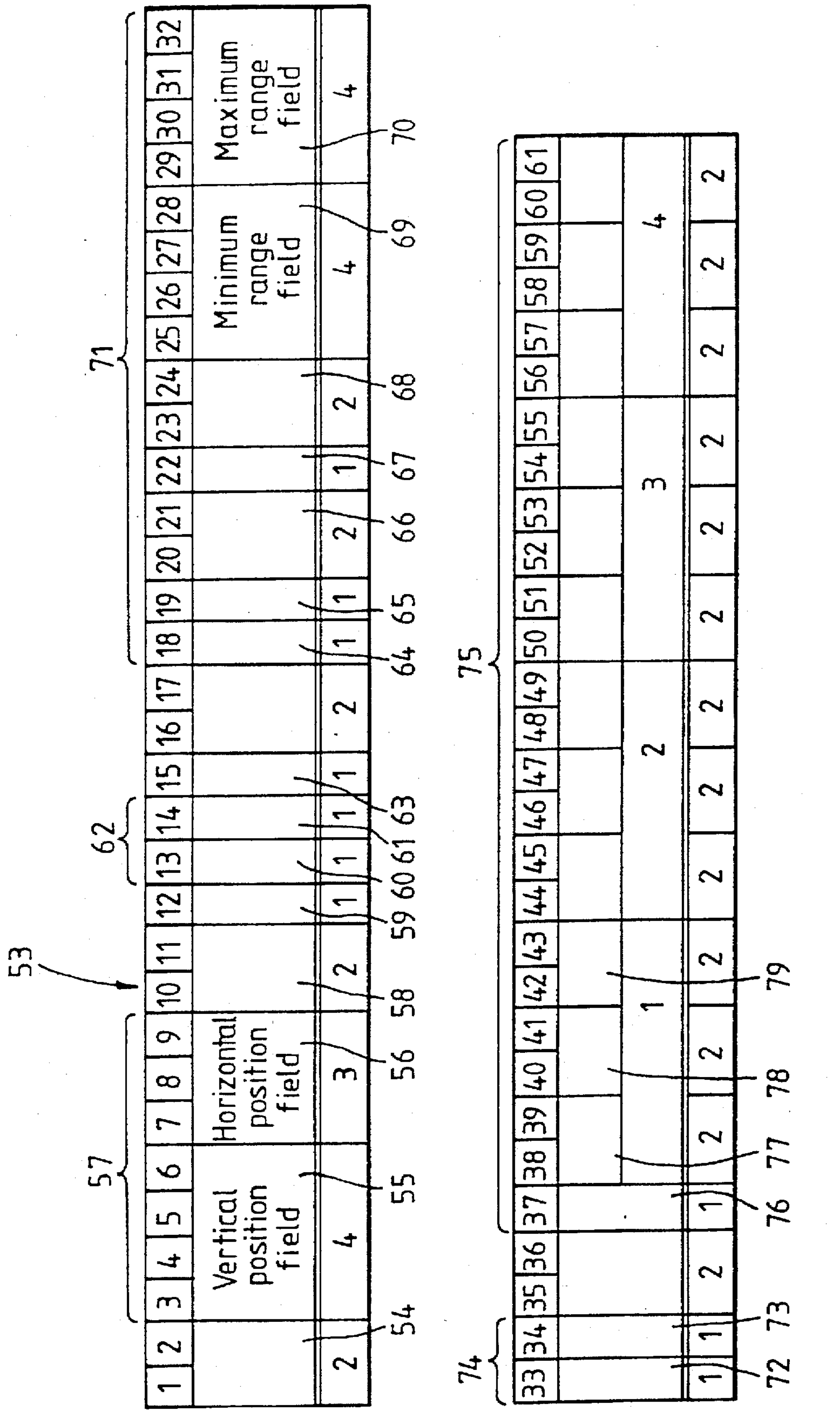
FIG. 11 shows the arrangement of the print field parameter space of the invention in the case of a character field.
Figure 12:
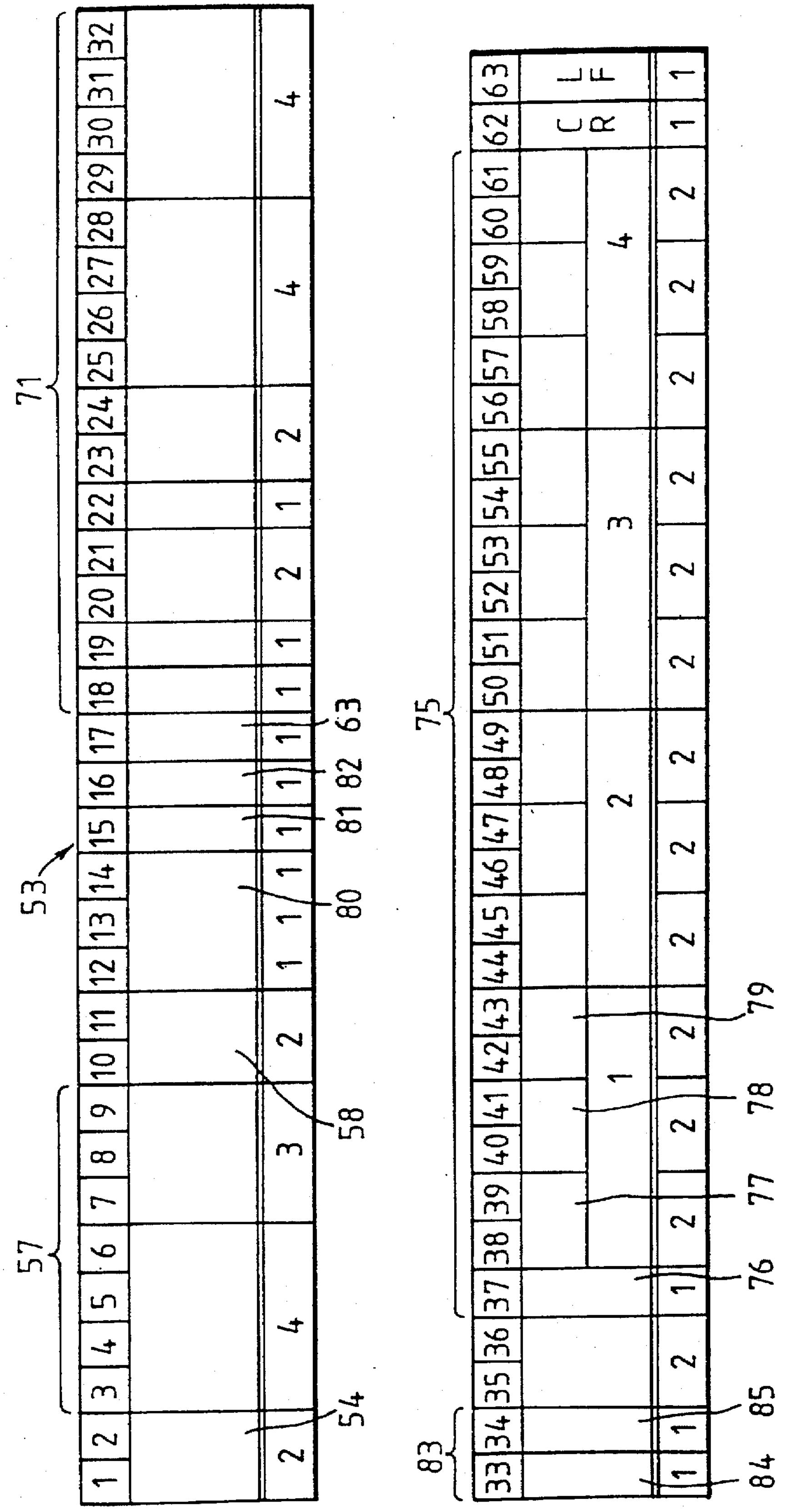
FIG. 12 shows the arrangement of the print field parameter space of the invention in the case of a bar code field.

Details of the sub print field parameter spaces 53 are shown in FIGS. 11 and 12. The sub print field parameter space 53 shown in FIG. 11 relates to the printing of character data in a character field of the label 19, while the sub print field parameter space 53 shown in FIG. 12 relates to the printing of data in a bar code field of the label 19.

The sub print field parameter space 53 for a character field of FIG. 11 is first explained. This sub print field parameter space 53 includes a print data type field 54, a print position field 57 comprised of a vertical position field 55 and a horizontal position field 56, a number of digits field 58, a pitch field 59, a scale factor field 62 comprised of a vertical scale factor field 60 and a horizontal scale factor field 61, a direction field 63, a numbering function setting field 71 comprised of a function field 64, a consecutive number field 65, a starting digit field 66, a consecutive digit field 67, an increment/decrement field 68, a minimum range field 69 and a maximum range field 70, a processing condition setting field 74 comprised of a processing field 72 and a processing condition field 73, and a print data specification field 75.

The print data specification field 75 includes a data specification field 76 and blocks 1, 2, 3, and 4. Each of the blocks 1 to 4 is includes a data number field 77, starting position field 78 and number of digits field 79.

The print data type field 54 is used to set the sub print field parameter space 53 to a character field or to a bar code field. In the case of a character field, field 54 is also used to set character type to S, M, OB (OCR-B font), WL, U, kanji 16, or kanji 24.

Figure 13:
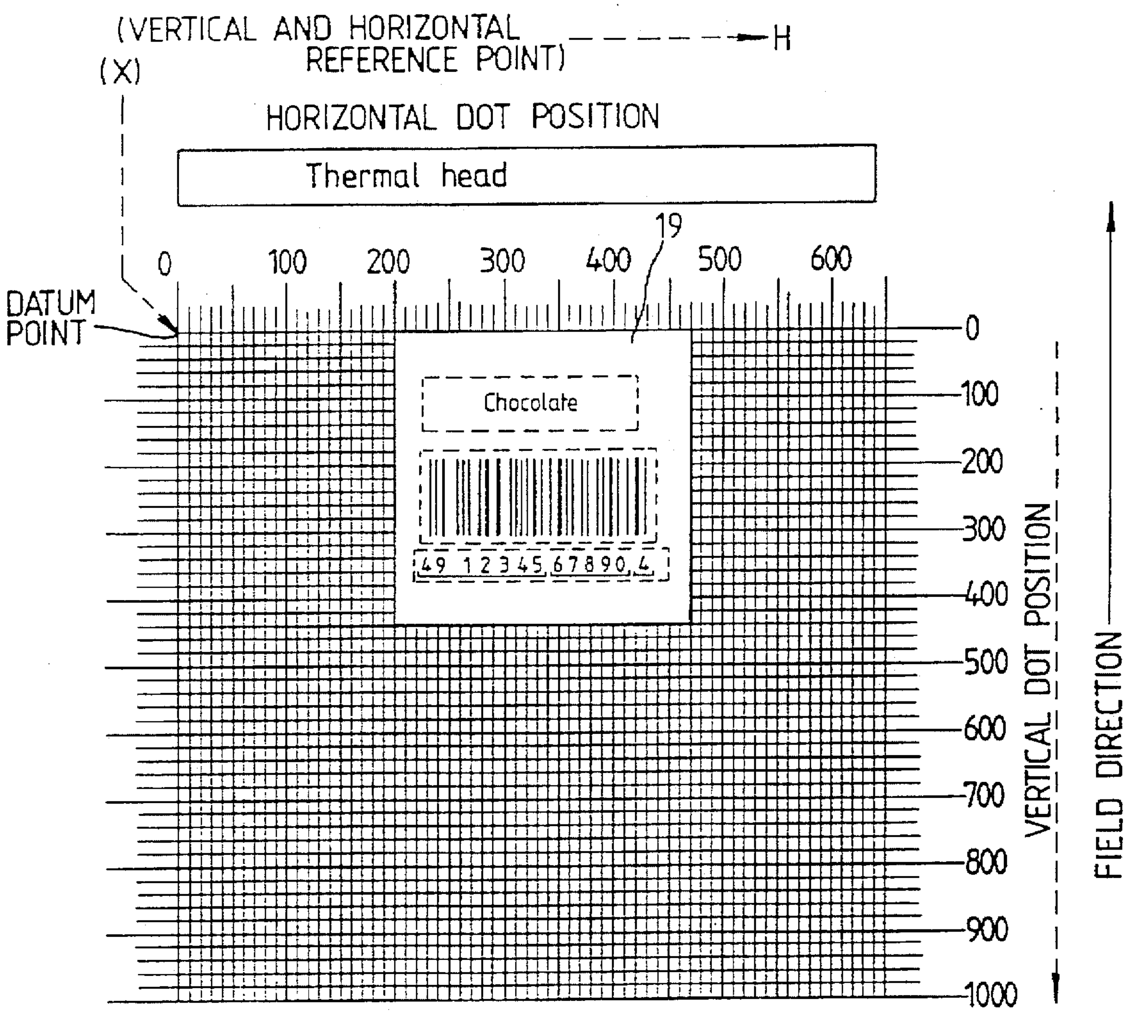
FIG. 13 is a front view of a label of the invention, showing the print position image.

The print position field 57 is for designating the position at which printing starts on the label 19, in terms of X and Y coordinates, as shown in FIG. 13. The number of digits field 58 is for setting the maximum number of print data digits. The pitch field 59 designates the spacing between characters. The scale factor field 62 is used to set the factor by which characters are enlarged vertically and horizontally. The direction field 63 designates the direction in which characters are printed, and the forward mode, or the modes to which characters are rotated by 90, 180, or 270 degrees.

The numbering function setting field 71 is for setting whether or not to print consecutive numbers according to function field 64. When consecutive numbers are to be printed, consecutive number field 65 is used to designate whether the numbers are printed incrementally or decrementally. The position at which the printing of consecutive numbers starts is set by starting digit field 66, the number of consecutive number digits by consecutive digit field 67, whether the numbers run incrementally or decrementally by increment/decrement field 68, the minimum range of consecutive numbering by minimum range field 69, and the maximum range of the consecutive numbering by maximum range field 70.

Processing condition setting field 74 is used to set whether or not symbols are to be supplemented according to processing field 72, and, in accordance with processing condition field 73, sets ¥, supplement, ¥ supplement, or bar supplement.

Print data specification field 75 is for designating data to be printed in the print fields 01 to 30 as indicated by print field numbers 01 to 30.

Data specification field 76 is for setting a mode whereby the data to be printed is designated by sub data parameter space 44 data numbers 01 to 30, or a mode whereby designated print data already set in a sub print field parameter space 53 is copied.

When data specification field 76 is set to the mode whereby the data to be printed is designated by sub data parameter space 44 data numbers 01 to 30, and block 1 is specified, the data to be printed in the print field can be designated by setting the data number of the print data stored in data number field 77, the print data starting column in starting position field 78, and the number of print data columns in the number of digits field 79 of block 1.

When data specification field 76 is set to the mode designating that print data already set in a sub print field parameter space 53 is to be copied, and when block 1 is specified, the data to be printed in the print field can be designated by setting the field number of the print data stored in data number field 77, the print data starting column starting position field 78, and the number of print data columns in the number of digits field 79 of block 1.

Since the functions of the data number field, starting position field and number of digits field of blocks 2, 3 and 4 are the same as those of block 1, further explanation thereof is not needed.

The sub print field parameter space 53 of the bar code field is explained, with reference to FIG. 12. As the composition of this sub print field parameter space 53 is substantially the same as the sub print field parameter space 53 of the character field described above. Thus, the following explanation will be limited to the differences. Fields of the other portions that are the same as the character field are shown with the same names, and explanation thereof is not necessary.

Whether a sub print field parameter space 53 relates to a character field or to a bar code field, it is set using print data type field 54, which, when set to the bar code field, also sets whether the type of bar code printed is JAN 8 digit, JAN 13 digit, UPC-E, NW-7, compressed NW7, CODE 39, ITF, or CODE 128.

The vertical length of the bar code is set by bar code vertical field 80. The ratio of thick and thin bars is set by bar ratio field 81. The bar code scale sector is set by scale factor field 82.

Processing condition setting field 83 designates whether the check digit is automatically calculated or not, in accordance with processing field 84, and also whether JAN 8 digit, JAN 13 digit, Price C/D or Modulus 43 is set by processing condition field 85.

Figure 14:
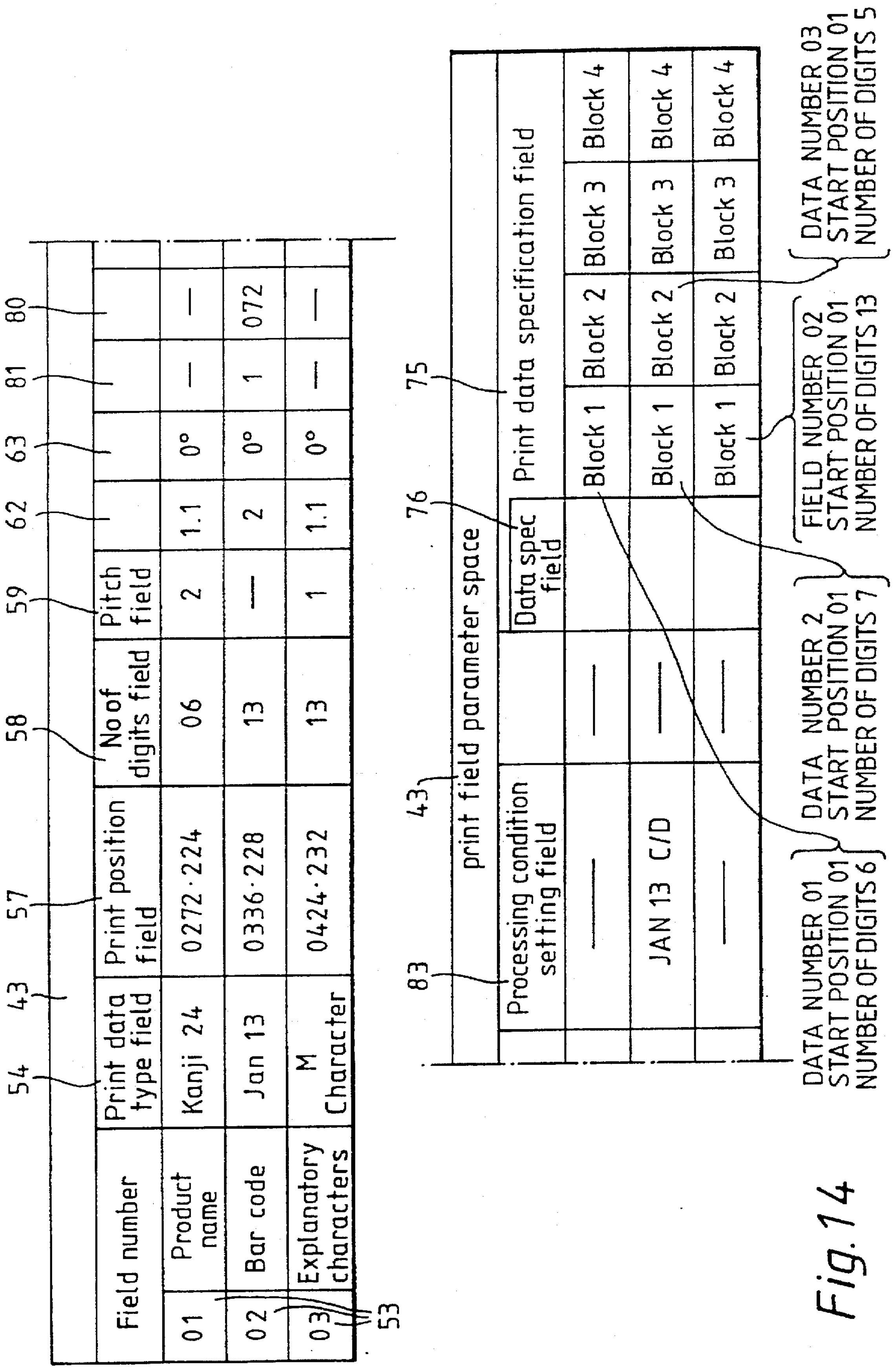
FIG. 14 shows the arrangement of the print field parameter space of the label according to the invention shown in FIG. 10.

FIG. 14 shows the arrangement of the print field parameter space 43 in the print fields 01, 02 and 03 for the label 19 of FIG. 10.

The data printed in print field 0i of the label 19 shown in FIG. 10 is "chocolate" (in katakana). Referring to FIG. 14, the data specification field 76 within the print data specification field 75 of the sub print field parameter space 53 is set to a data mode whereby the data to be printed is designated by sub data parameter space 44, data number 01.

Next, as block 1, the print data "chocolate" designated by data number 01 in the sub data parameter space 44, shown in FIG. 9, is designated as sub print field parameter space 53, print data of six digits, starting from starting position 01.

Blocks 2, 3 and 4 are not set; therefore print data is specified only by block 1.

For the data to be printed in print field 01 as specified by field number 01, the print data type field 54 parameter is set for print type kanji 24, the print position field 57 parameter is set for vertical print position 0272 and horizontal print position 224, the number of digits field 58 is set for six digits, the pitch field 59 parameter is set for a pitch of two, the scale factor field 62 is set for a vertical scale factor of one and a horizontal scale sector of one, and the direction field 63 is set for zero degrees.

The data to be printed in the print field 02 shown in FIG. 10 is a JAN 13 digit bar code 52, and the data specification field 76 of sub print field parameter space 53 field number 02, shown in FIG. 14, is set to data print mode.

As block 1 in the print data specification field 75, the print data specified by the sub data parameter space 44, data number 02 (flag manufacturer code 4912345) is specified as print data of sub print field parameter space 53, field number 02 having seven digits, counting from starting position 01. As block 2, the print data specified by the sub data parameter space 44, data number 03 (product code 67890) is specified as print data of sub print field parameter space 53, field number 02 having five digits, counting from starting position 01. No print data is specified in block 3 or block 4. Thus, the field 1 print data is the 491234567890 designated by blocks 1 and 2. For the print data specified for field number 02, the print data type field 54 parameter is set for JAN 13 digit, the print position field 57 parameter is set for vertical print position 0336 and horizontal print position 228, the number of digits field 58 is set for thirteen digits, the scale factor field 62 is set for a scale factor of two, the direction field 63 is set for zero degrees, the bar ratio field 81 is set for a bar ratio of one, the bar code vertical field 80 is set to 072, and the processing condition setting field 83 is set for JAN 13 and automatic check digit generation.

The data to be printed in print field 03 of the label 19, shown in FIG. 10, is the explanatory characters 4912345678904, which are of the same code as the print field 02 data (bar code 52).

With reference to FIG. 14, the print field copy mode is set by data specification field 76 of the print data specification field 75, and field number 02, as block 1, specifies that the print data is thirteen digits, starting from position 01. As a result, the data printed in print field 03 is the same code, 4912345678904, printed in print field 02. For the print data specified for field number 03, the print data type field 54 parameter is set for M character , the print position field 57 parameter is set for vertical print position 0424 and horizontal print position 232, the number of digits field 58 is set for thirteen digit data, the pitch field 59 parameter is set for a pitch of one, the scale factor field 62 is set for a vertical scale factor of one and a horizontal scale factor of one, and the direction field 63 is set for zero degrees.

Figure 15:
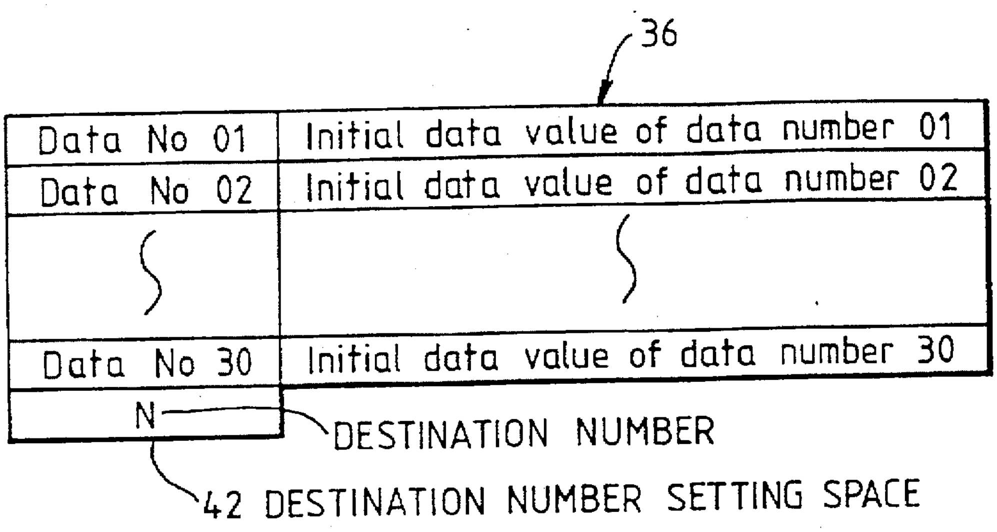
FIG. 15 shows the arrangement of the print data buffer space of the invention.

FIG. 15 is a general illustration of the storage of print data initial values in the print data buffer space 36 of DRAM 26.

The print data buffer space 36 is used to store data numbers 01 to 30, and the initial print data values designated by the data numbers 01 to 30. That is, initial print data values are developed from the initial print data value parameters set in the initial data value parameter setting space 39 of the sub data parameter spaces 44 in the print data parameter space 41 that are stored in the SRAM 25, in accordance with the parameter settings in each attribute field 47, number of digits field 48, type field 49, processing condition field 50 and status field 51, and are stored in the print data buffer space 36 together with the corresponding data numbers 01 to 30.

It is arranged so that when the initial print data value parameters in the sub data parameter spaces 44 of the SRAM 25 are developed into initial print data values in the print data buffer space 36 of DRAM 26, the destination number N set in the destination number setting space 42 of the data field parameter file 40 is also stored in the print data buffer space 36.

Figure 16:
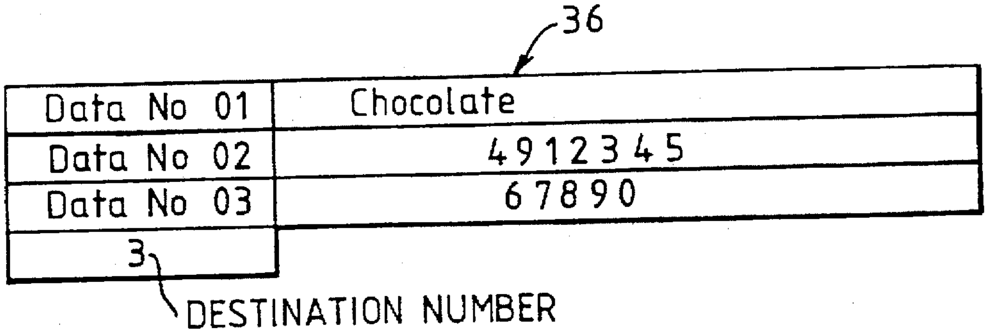
FIG. 16 shows the arrangement of the print data buffer space when printing the label of the invention shown in FIG. 10.

FIG. 16 shows the initial print data value parameters of the print data parameter space 41, shown in FIG. 9, developed and stored in the DRAM 26 at print data buffer space 36 as initial print data values.

In accordance with the data parameters set in the print data parameter space 41, the initial print data value corresponding to data number 01 is developed and stored in the print data buffer space 36 as "chocolate", the initial print data value corresponding to data number 02 as flag manufacturer code 4912345, and the initial print data value corresponding to data number 03 as product code 67890. Also, "3" is stored as the destination number N.

Figure 17:
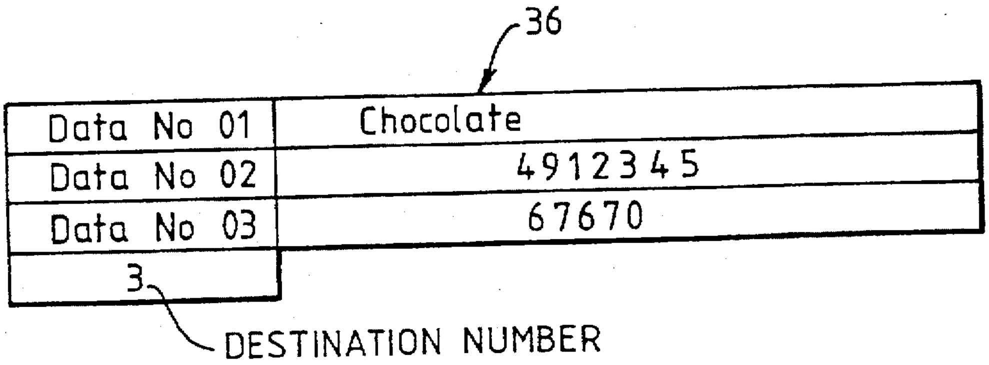
FIG. 17 shows the arrangement of the print data buffer space when printing the label of the invention shown in FIG. 18.
Figure 18:
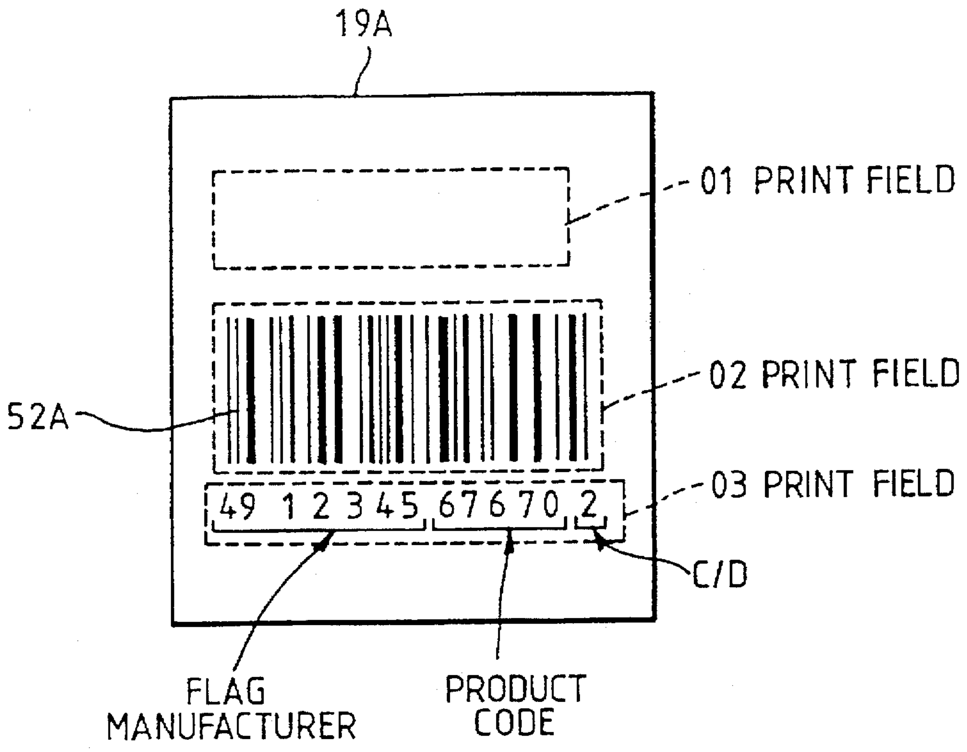
FIG. 18 is a front view of a label that has been printed based on the jump function of the invention.

FIG. 17 shows the storage status of changed initial print data values in the print data buffer space 36, after the print data has been changed, and following the printing of the label 19 of FIG. 10, in order to print out label 19A of FIG. 18. To print out label 19A, the initial value 67890 of the product code constituting the print data of data number 03 in the print data buffer space 36 has been changed to 67670.

Figure 19:
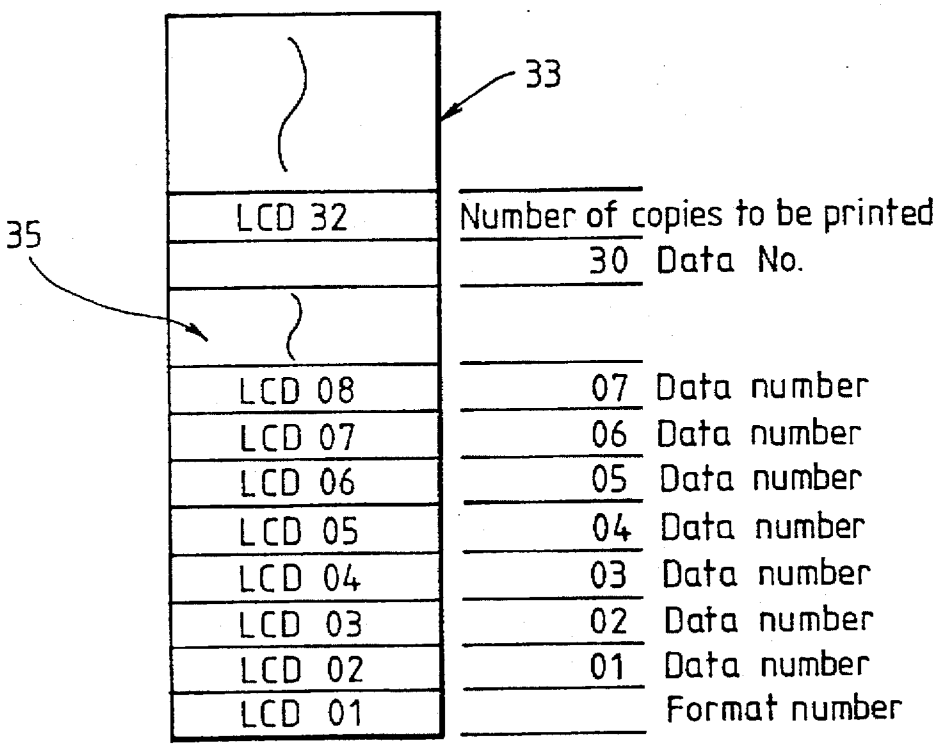
FIG. 19 shows the arrangement of the jump table of the invention.

FIG. 19 shows the arrangement of an essential part of the present invention, the jump table 35 stored in the program space 33 of the DRAM 26. The jump table 35 is arranged so that when the print data parameter space 41 parameters in the data field parameter file 40 in the SRAM 25 are read into DRAM 26 at print data buffer space 36 by the CPU 22, the format number FM in the data field parameter file 40 together with the process addresses LCD01–LCD32 corresponding to the operation screens, are stored in the program space 33 of the DRAM 26. A prescribed program is stored whereby prescribed operation screens at specific addresses in ROM 24 specified by LCDO1–LCD32 are displayed on the touch-screen unit 13 in a prescribed order.

Thus, after printing a label 19 according to the initial print data values, the CPU 22 reads out the destination number N in the print data buffer space 36, then reads out the process address LCD02–LCD31 corresponding to the data number 01–30 specified by the destination number N. The ROM 24 program designated by the process address LCD02–LCD31 is executed. Such execution causes the data entry screen specified by a data number 01–30 in the print data buffer space 36, designated by the destination number N, to be displayed on the touch-screen unit 13, which is followed by prescribed operation screens displayed in sequence.

Figure 20:
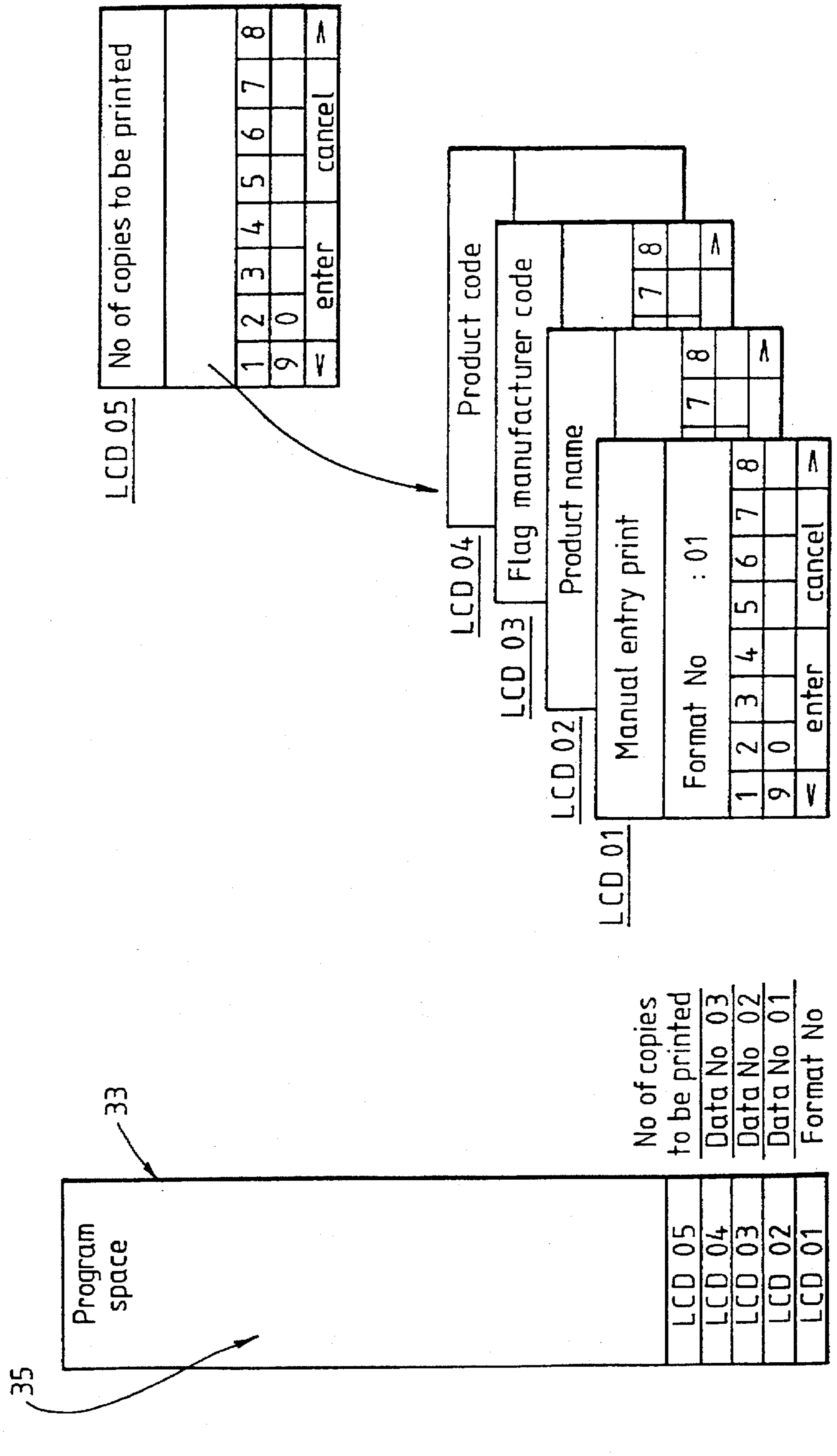
FIG. 20 shows the arrangement of the jump table when printing the label of FIG. 18.

FIG. 20 shows the correspondence between the status of the jump table 35 produced in the program space 33 of the DRAM 26 when the print data parameter space 41 parameters are read into the print data buffer space 36 of DRAM 26, and the data entry screen displayed on the touch-screen unit 13 when the ROM 24 program specified by a jump table 35 process address LCD01–LCD05 is executed.

The label printing operation of the label printer 10 is susequently described.

Figure 21:
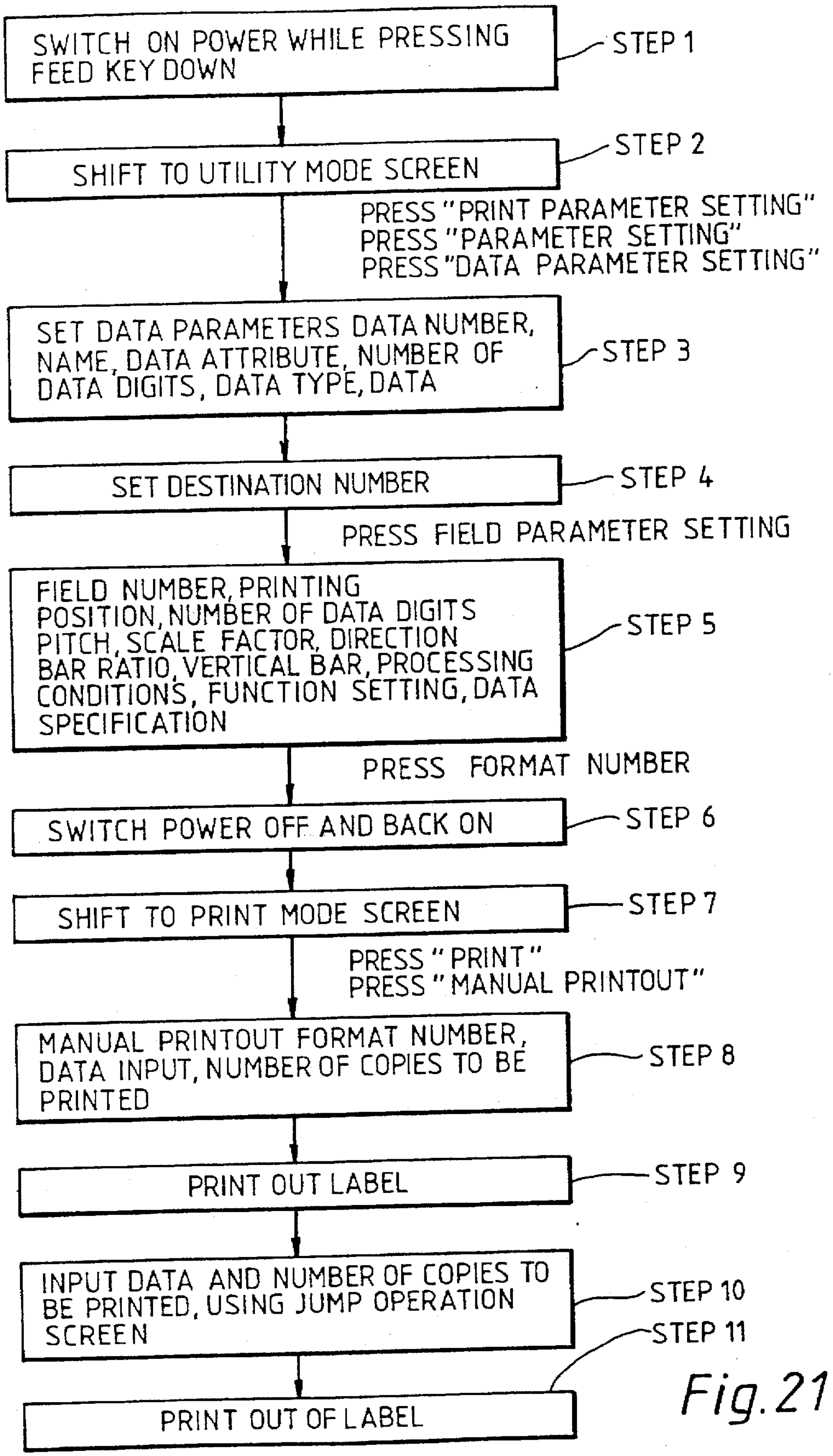
FIG. 21 is a flow chart of the label printing operation of the label printer of the invention.

First, the label printing operation will be described in outline, with reference to the flow chart of FIG. 21.

In step 1, a power switch (not shown) is closed while pressing a feed key (not shown), resulting in step 2 which is the display of a utility mode screen on the touch-screen unit 13. Touching prescribed areas displayed on this utility mode screen brings up a data parameter setting screen, in step 3. This data parameter setting screen is used to set prescribed parameters such as data number, name, data attributes, number of data digits, data type, and so forth.

Next, in step 4, the destination number of the operation screen following the printing of the label is entered.

In step 5 the process shifts to the field parameter setting screen for setting prescribed print field parameters such as field number, print position, number of data digits, pitch, scale factor, direction, bar ratio, bar height, processing, functions, data specifications and the like.

In step 6 the electric power is switched off and back on, resulting in step 7 of a print mode screen being displayed on the touch-screen unit 13.

When a prescribed display area of the print mode screen is touched to select manual mode, followed in step 8 by the entry of format number, input data and the number of copies to be printed, in step 9 the prescribed number of labels 19 are printed out in the prescribed format.

In step 10 the prescribed screen to which the process has jumped is displayed. After input of the data and the number of copies to be printed, resulting in step 11 in the printing of labels 19 based on the data thus entered.

Details of the operation of printing the label 19, shown in FIG. 10, using the label printer 10 having the above-described configuration, will now be described with reference to FIGS. 22 to 65.

The operation of setting print data parameters and print field parameters is subsequently described with reference to FIGS. 22 to 57.

Figure 22:
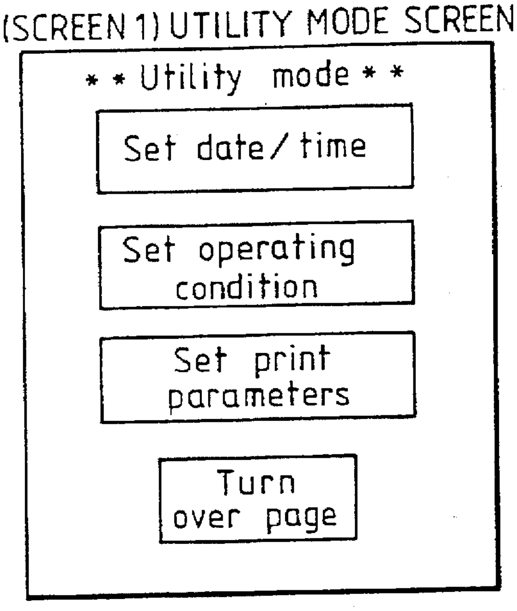
FIG. 22 shows a utility mode screen on the touch-screen unit of this invention.

To set print data parameters, first, when the power is switched on while the feed key is pressed, under the control of the CPU 22 the program in the ROM 24 moves the utility mode screen data stored in the ROM 24 into the VRAM 27. Next, the touch-screen control section 29 displays the utility mode screen, indicated as screen 1, on the LCD 20 of the touch-screen unit 13 (FIG. 22).

Figure 23:
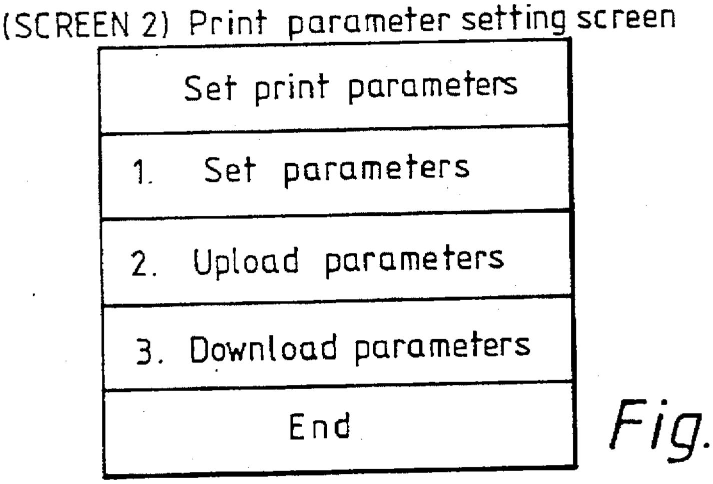
FIG. 23 shows a print parameter setting screen on the touch-screen unit of the invention.

When the operator touches a print data parameter setting area of the touch-panel 21, the location of the touch is detected by the CPU 22, and in accordance with a program stored beforehand in the ROM 24, the data of the next operation screen is read out of ROM 24 to the VRAM 27, to display print data parameter setting screen as screen 2 on the touch-screen unit 13 (FIG. 23).

Figure 24:
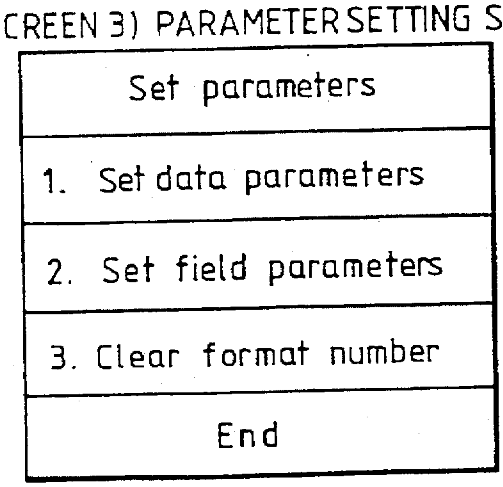
FIG. 24 shows a parameter setting screen on the touch-screen unit of the invention.

Next, when the operator touches the Parameter Setting area of screen 2, the next operation screen data is read out of ROM 24 by the CPU 22 and displayed on the touch-screen unit 13 as parameter setting screen, indicated as screen 3 (FIG. 24).

Figure 25:
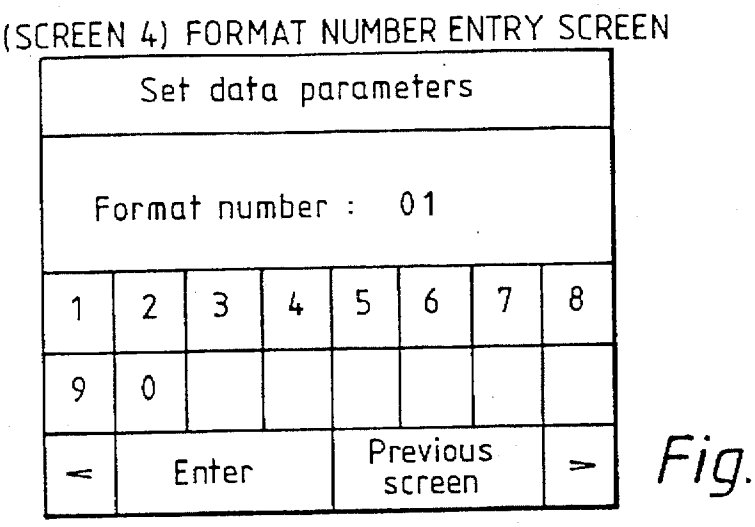
FIG. 25 shows a format number entry screen on the touch-screen unit of the invention.

When the Data Parameter Setting area of screen 3 is touched, the next operation screen data is read out of ROM 24 by the CPU 22 and displayed on the touch-screen unit 13 as format number entry screen, screen 4 (FIG. 25).

Figure 26:
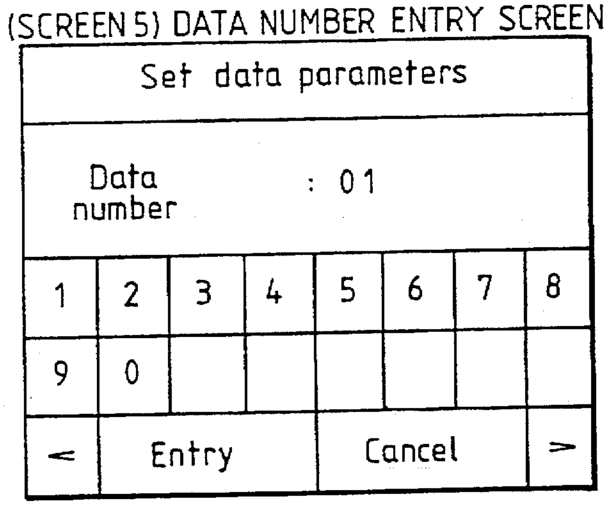
FIG. 26 shows a data number entry screen on the touch-screen unit of the invention.
Figure 27:
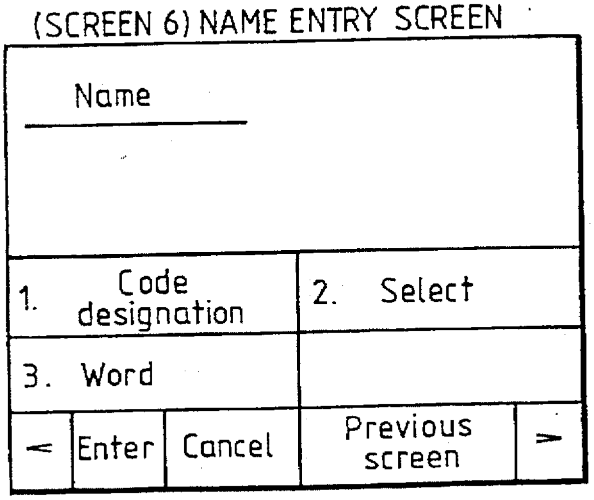
FIG. 27 shows a name entry screen on the touch-screen unit of the invention.

Entering format number 01 by the format number entry screen results in the CPU 22 displaying on the touch-screen unit 13, as screen 5, the data number entry screen (FIG. 26). Entering data number 01 by the data number entry screen 5 and touching the Enter area causes the CPU 22 to display, as screen 6, the name entry screen (FIG. 27).

Figure 28:
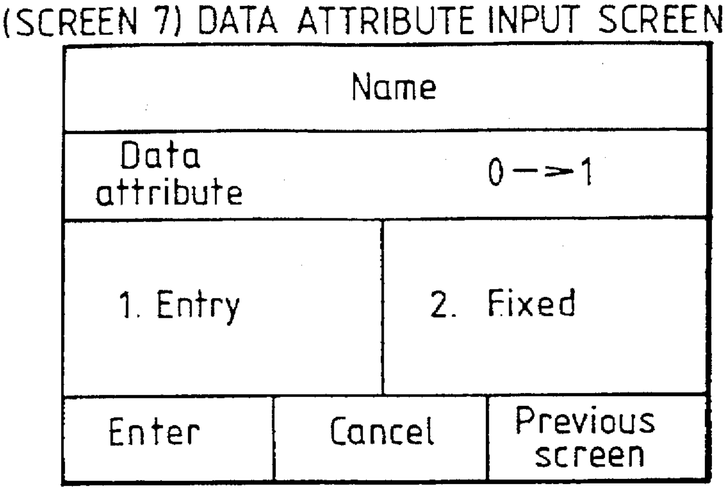
FIG. 28 shows a data attribute entry screen on the touch-screen unit of the invention.

After touching the prescribed Code Designation, Select and Word areas of name entry screen 6 and entering the product name, touching the Enter area causes the CPU 22 to display data attribute entry screen, screen 9 (FIG. 28).

Figure 29:
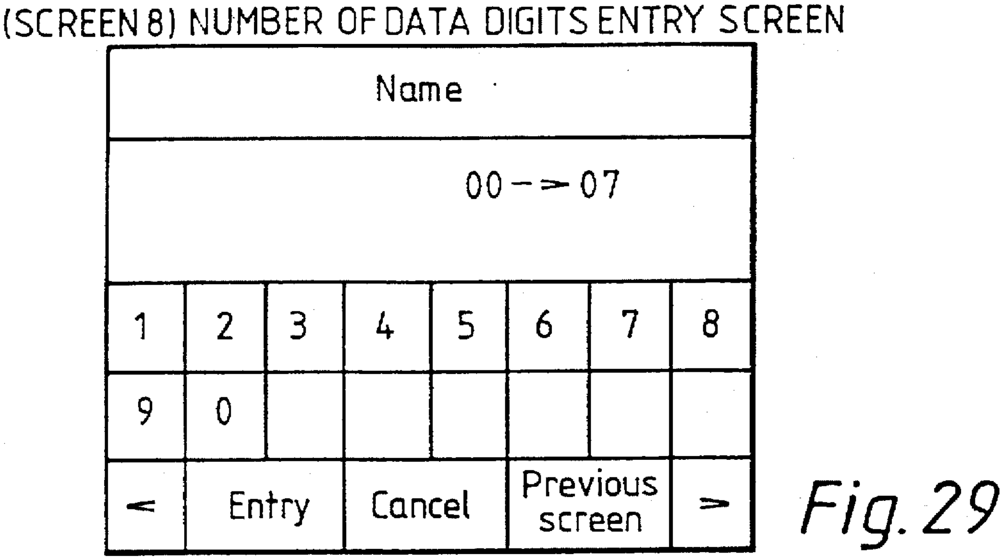
FIG. 29 shows a number or digits entry screen on the touch-screen unit of the invention.
Figure 30:
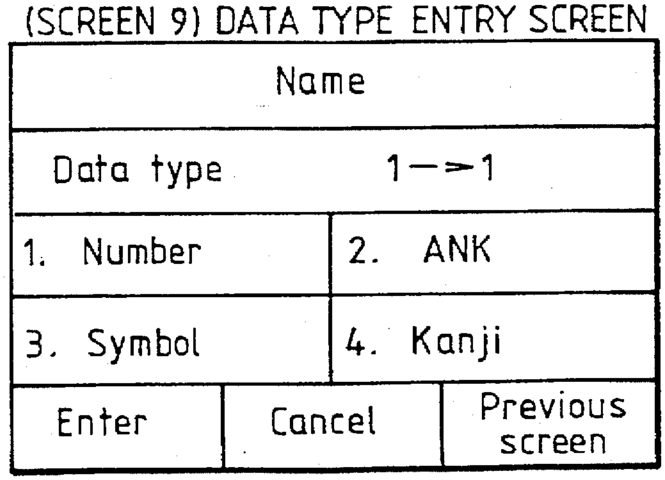
FIG. 30 shows a data type entry screen on the touch-screen unit of the invention.

When the Entry area of screen 7 is touched and thereafter the Enter area, the CPU 22 displays as screen 8 the number of data digits entry screen (FIG. 29). When this screen 8 is used to enter 06 as the number of data digits, and the Enter area is touched, the CPU 22 displays the data type entry screen as screen 9 (FIG. 30).

Figure 31:
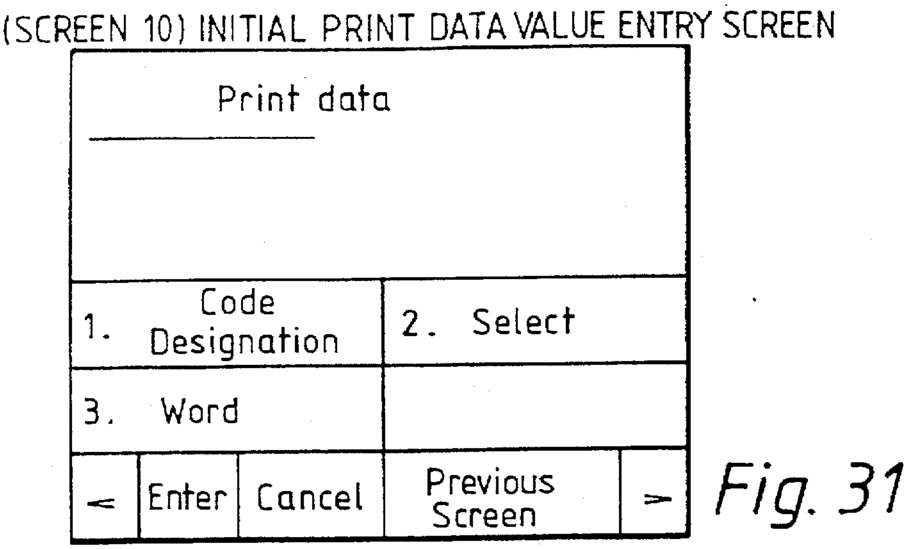
FIG. 31 shows an initial print data value entry screen on the touch-screen unit of the invention.
Figure 32:
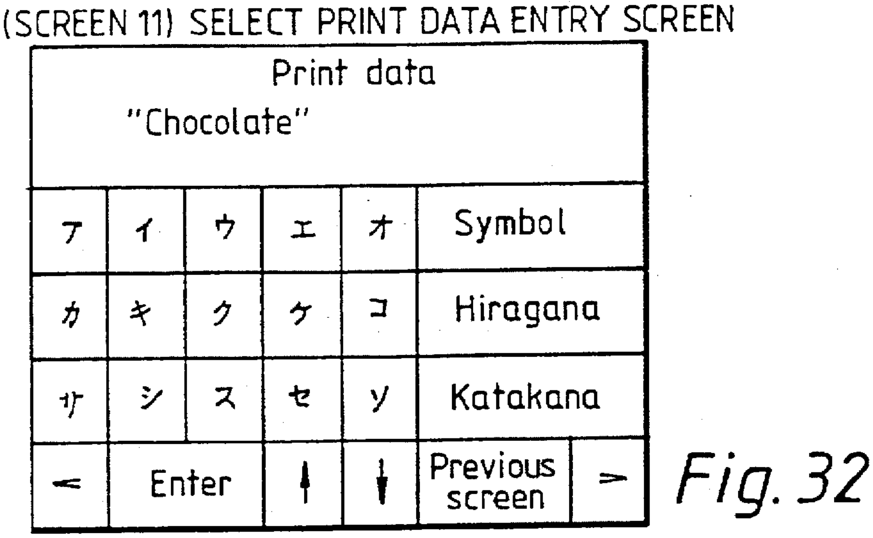
FIG. 32 shows a select print data entry screen on the touch-screen unit of the invention.

Selecting the Kanji area in screen 9 followed by the Enter area brings up a display of the print data initial value entry screen as screen 10 (FIG. 31).

Figure 33:
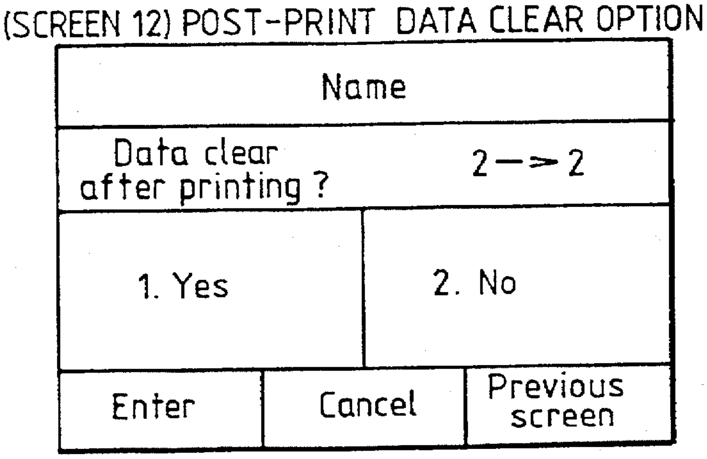
FIG. 33 shows a post-print data clear option screen on the touch-screen unit of the invention.
Figure 34:
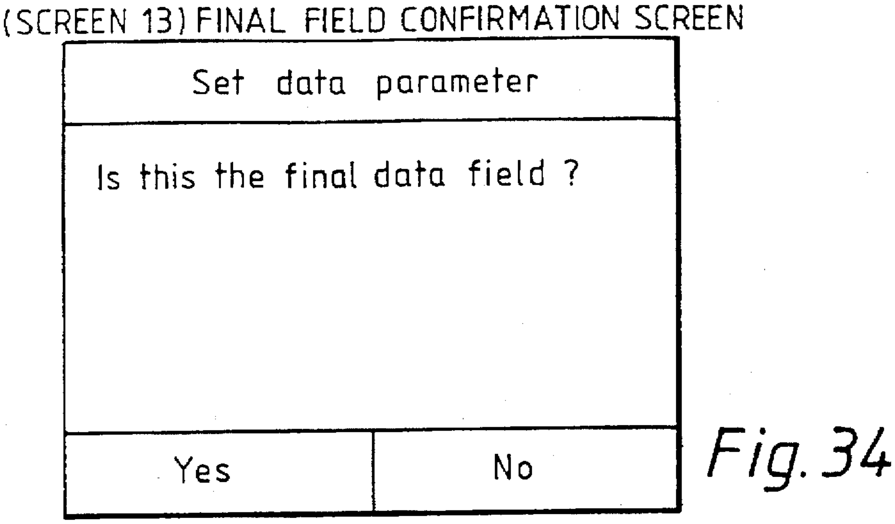
FIG. 34 shows an end field confirmation screen on the touch-screen unit of the invention.

After the Select area of the print data initial value entry screen 10 is touched and the select print data entry screen 11 is used to input "chocolate" as the initial print data value (FIG. 32), touching the Enter area redisplays print data initial value entry screen 10. When the Enter area of screen 10 is touched, the display shifts to screen 12, which is the data clear option screen (FIG. 33). The No area of screen 12 is touched, followed by the Enter area, completing the setting of the print data parameters designated by sub data parameter space 44 data number 01 shown in FIG. 9. Touching the Enter area of the data clear option screen 12 brings up a display of screen 13, the data parameter end field confirmation screen (FIG. 34), so the No area is touched, to revert to the display of the data number entry screen 5 (FIG. 26). The above operations are used to set each of the print data parameters designated by sub data parameter space 44 data numbers 02 and 03 shown in FIG. 9.

In view of the operation described above set each of the print data parameters designated by sub data parameter space 44, operation which respect to data numbers 02 and 03 can be readily understood from the above explanation of the operation relating to data number 01, and therefore separate explanations relating to data numbers 02 and 03 are omitted.

Figure 35:
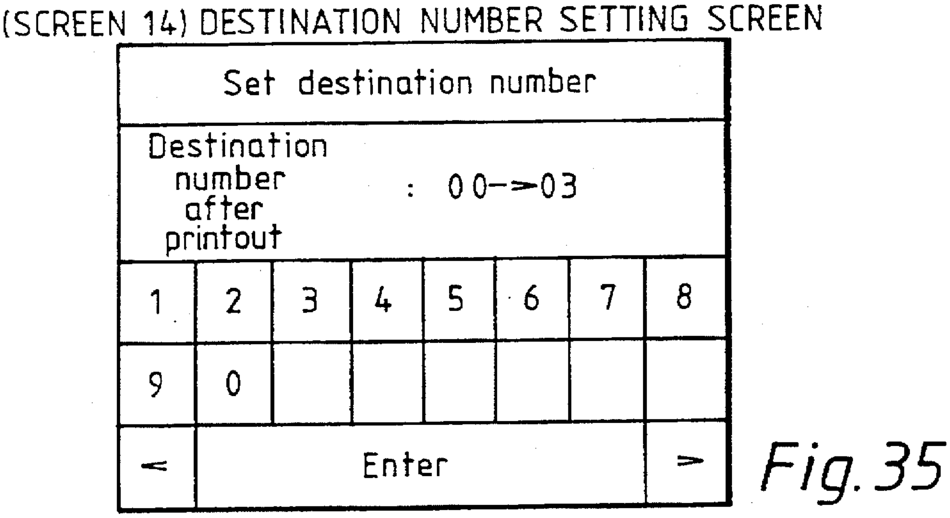
FIG. 35 shows a destination number setting screen on the touch-screen unit of the invention.

After the operation of setting the print data parameters of sub data parameter space 44 with respect to data number 03 has been completed, touching the Yes area of the data parameter end field confirmation screen 13 brings up the destination number setting screen 14, shown in FIG. 35. Destination number "3" is entered by screen 14, and the Enter area is then touched, redisplaying the format number entry screen 4 (FIG. 25). In the same way as described above, this format number entry screen 4 is used to set print data parameters for the required number of format numbers 02–99. For the sake of simplicity, the explanation made with respect to the label 19 of FIG. 10 has been limited to print data parameters relating to format number 01.

After all the print data parameters have been set for format numbers 01–99, the Previous Screen area of format number entry screen 4 is touched to redisplay screen 3, the parameter setting screen (FIG. 24).

Figure 36:
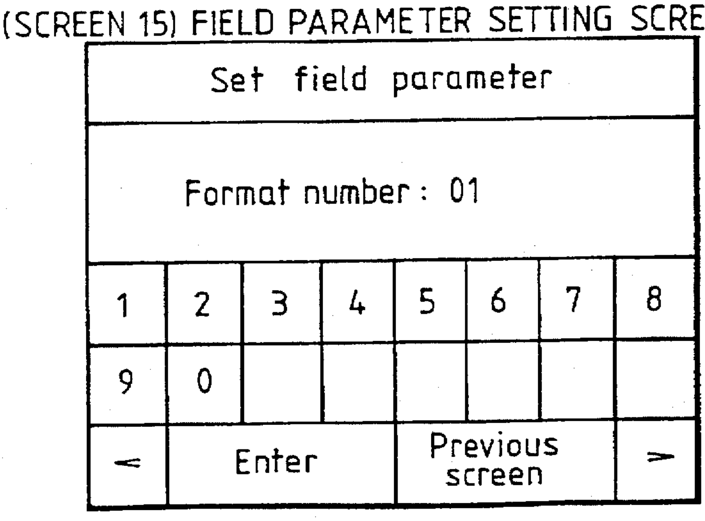
FIG. 36 shows a field parameter setting screen on the touch-screen unit of the invention.

When the Field Parameter Setting area of screen 3 is touched, the display shifts to field parameter setting screen 15 to thereby set the print field parameters (FIG. 36).

Figure 37:
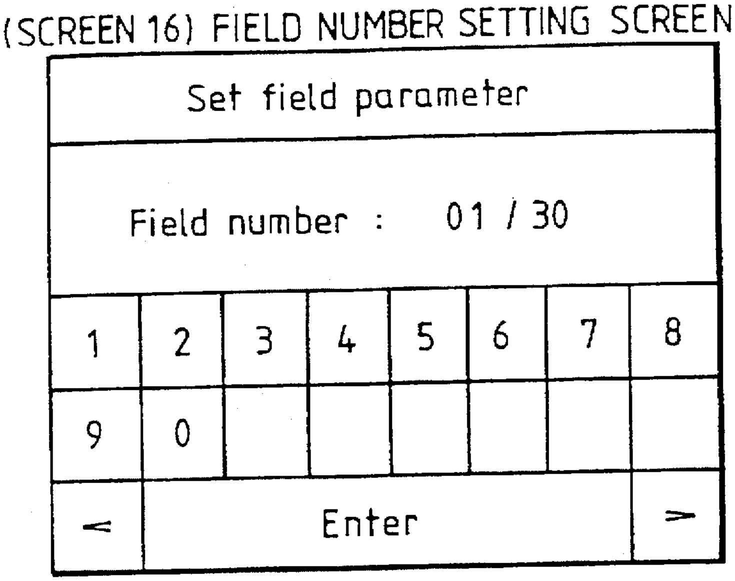
FIG. 37 shows a field number setting screen on the touch-screen unit of the invention.
Figure 38:
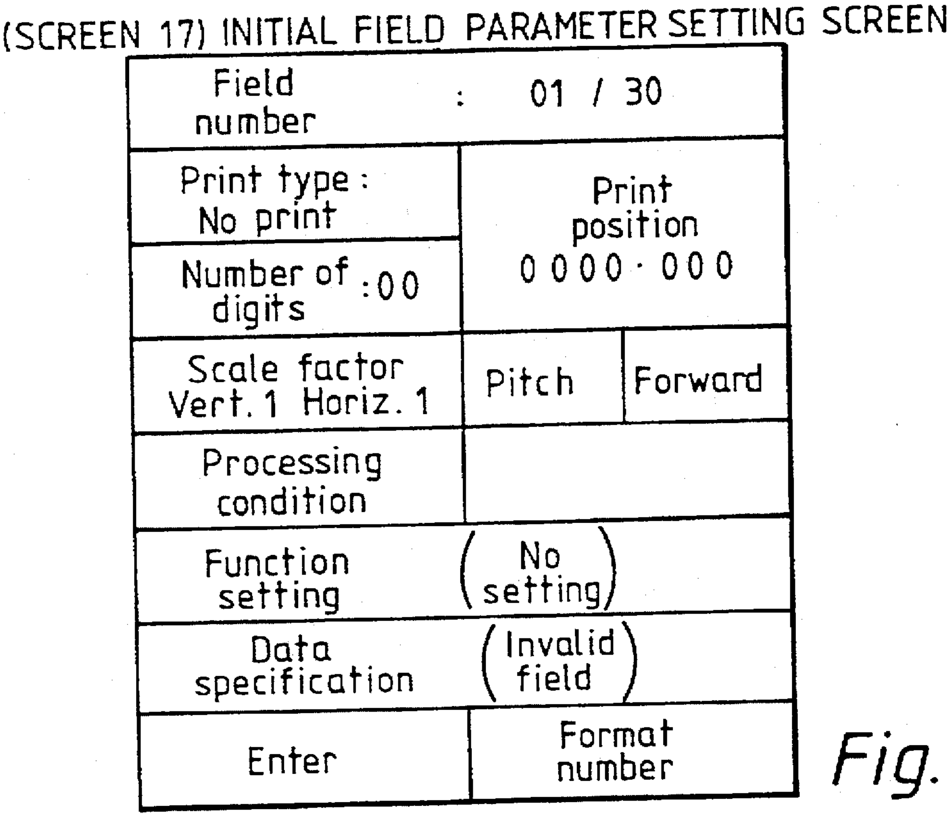
FIG. 38 shows a field parameter setting screen on the touch-screen unit of the invention.

Format number 01 is input via screen 15 and the Enter area is touched, bringing field number setting screen 16 to the display (FIG. 37). When field number 01 has been entered via this screen 16, the Enter area is touched to display the initial field parameter setting screen 17 (FIG. 38).

Touching the Print Type: No Print area of the initial field parameter setting screen 17 brings up a display of the character field setting screen 18 (FIG. 39). Touching the Character area of screen 18, followed by the Enter area, moves the process to the next display screen which is character type selection screen 19 (FIG. 40).

Figure 41:
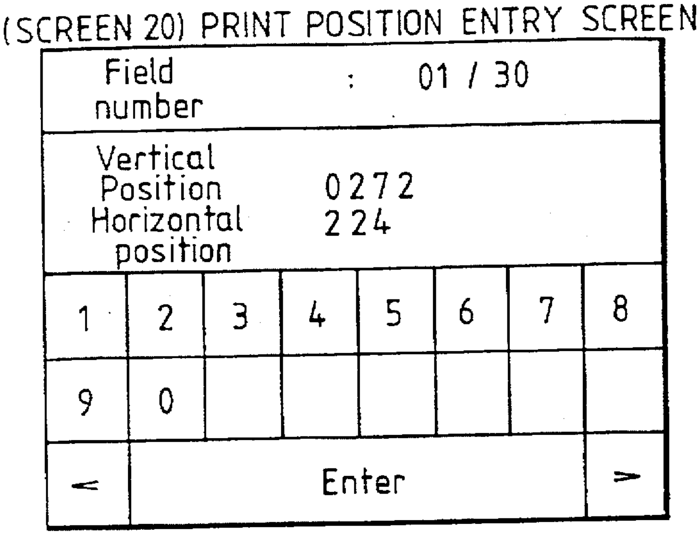
FIG. 41 shows a print position entry screen on the touch-screen unit of the invention.

When the Kanji 24 area of the character type selection screen 19 is touched followed by the Enter area, character field setting screen 18 is displayed (FIG. 39). When the Print Position area of the screen 18 is touched, the display changes to print position entry screen 20, whereby vertical position 0272 and horizontal position 224 are entered (FIG. 41).

Figure 42:
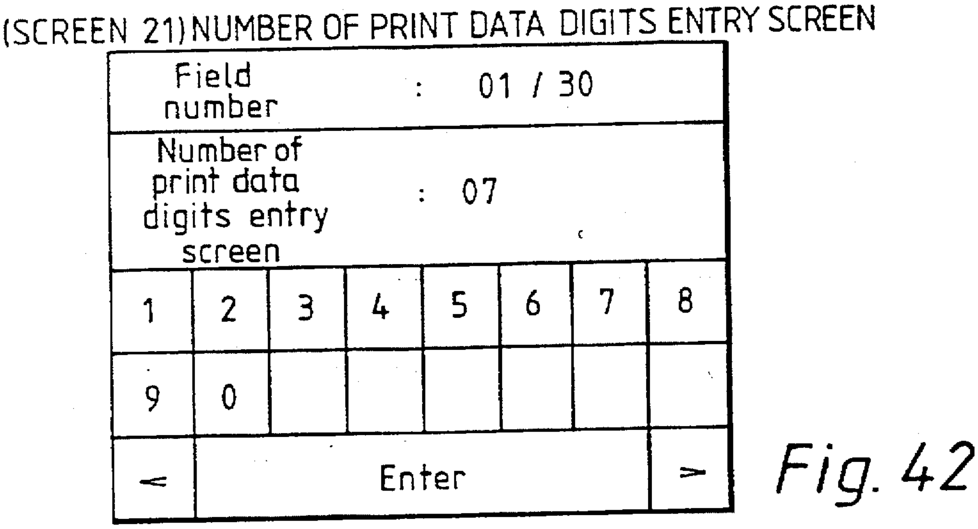
FIG. 42 shows a number of print data digits entry screen on the touch-screen unit of the invention.
Figure 43:
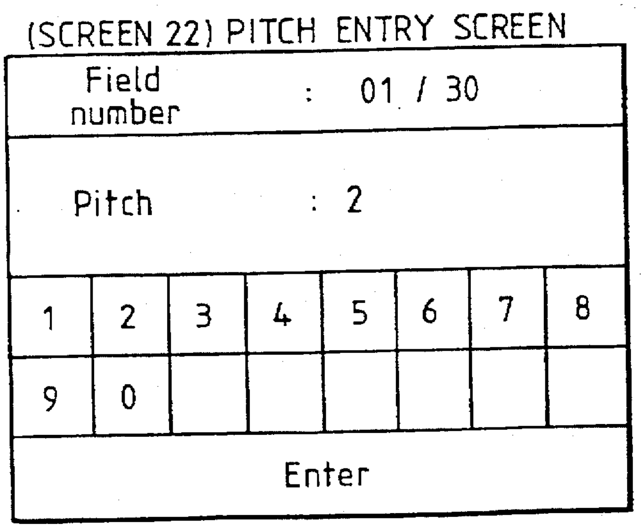
FIG. 43 shows a pitch entry screen on the touch-screen unit of the invention.

Similarly, touching the Number of Digits area of the character field setting screen 18 shifts the display to the number of print data digits screen 21, which is used to enter 06 as the number of digits (FIG. 42). Touching the Pitch area of screen 18 changes the display to the pitch entry screen 22, which is used to enter a character pitch of 2 (FIG. 43).

Figure 44:
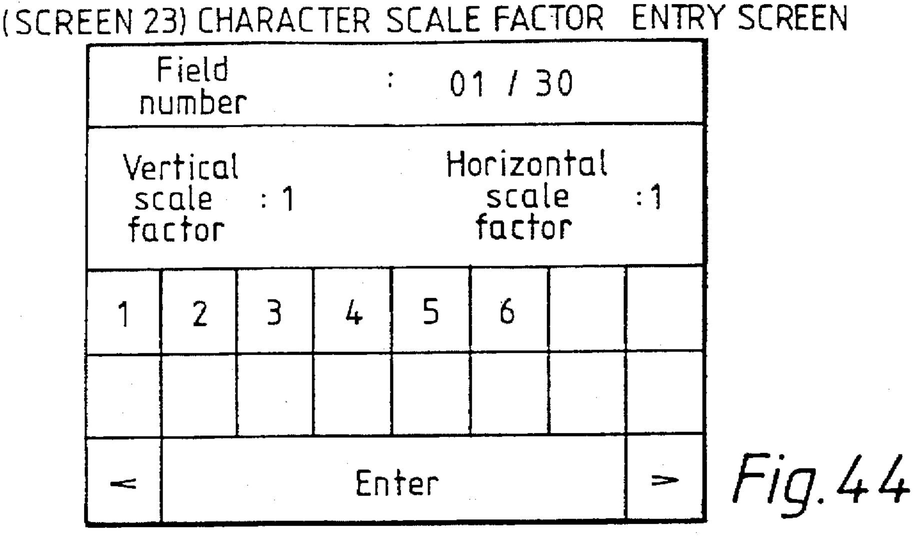
FIG. 44 shows a character scale factor entry screen on the touch-screen unit of the invention.

The Scale Factor area of the character field setting screen 18 is touched to enter a vertical scale sector of 1 and a horizontal scale factor of 1 by character scale factor entry screen 23 (FIG. 44).

Figure 45:
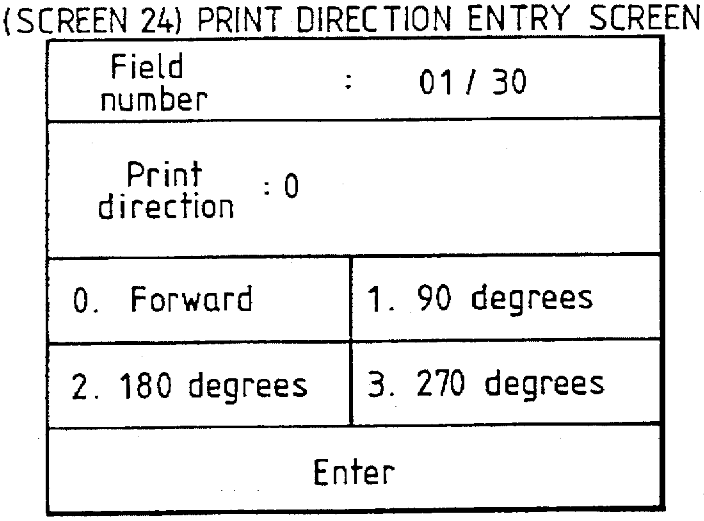
FIG. 45 shows a print direction entry screen on the touch-screen unit of the invention.

Next, the Forward area of character field setting screen 18 is touched to set printing direction to forward by print direction entry screen 24 (FIG. 45).

Figure 46:
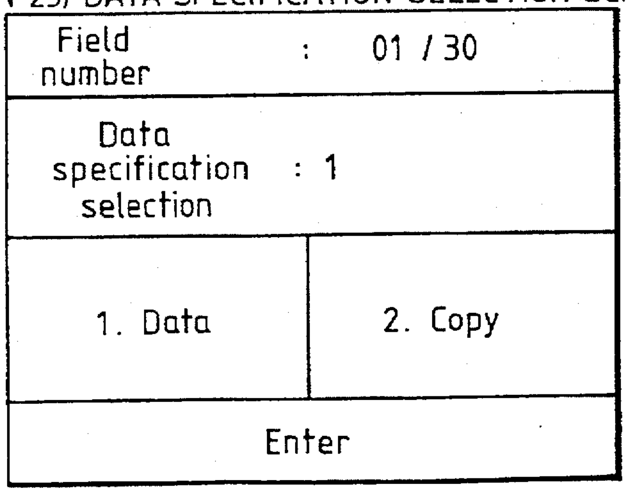
FIG. 46 shows a data specification selection screen on the touch-screen unit of the invention.

The Data Specification area of screen 18 is then touched, moving the display to data specification selection screen 25 (FIG. 46). Touching the Data area of this screen 25, followed by the Enter area, brings up the display of data block setting screen 26 (FIG. 47). When block 1 is selected in screen 26, the display shifts to initial data value setting screen 27 (FIG. 48).

After the data number 01, starting digit 01 and number of digits 06 are entered by the initial data value setting screen 27 and the Enter area is touched, specifying "chocolate" as the initial print data value parameter, the display reverts to data block setting screen 26 (FIG. 47).

When the End area of the data block setting screen 26 is touched, data specification selection screen 25 is displayed (FIG. 46), and when the Enter area is touched, the display returns to field number setting screen 16 (FIG. 37).

After using field number setting screen 16 to enter field number 02, touching the Enter area shifts the display to character field setting screen 18 (FIG. 39). When the Print Type: Character area in screen 18 is touched, print data type selection screen 28 is displayed (FIG. 49), and when the Bar Code area is touched, the display shifts to bar code type selection screen 29 (FIG. 50).

After selecting JAN 13 in bar code type selection screen 29, the display moves to bar code field setting screen 30 (FIG. 51). The Print Position area of screen 30 is touched to display print position entry screen 20, which is used to enter vertical position 0336 and horizontal position 228 (FIG. 41).

Figure 52:
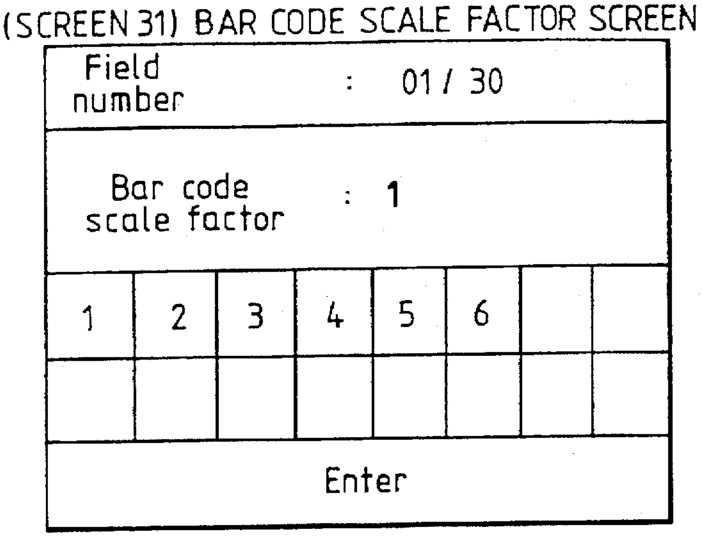
FIG. 52 shows a bar code scale factor screen on the touch-screen unit of the invention.
Figure 53:
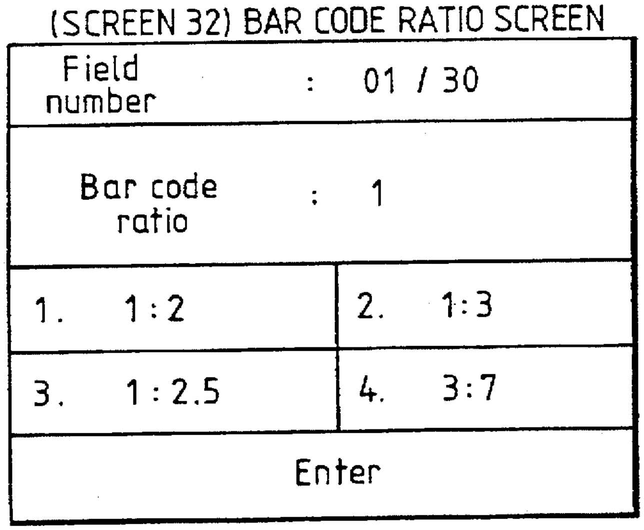
FIG. 53 shows a bar code ratio screen on the touch-screen unit of the invention.
Figure 54:
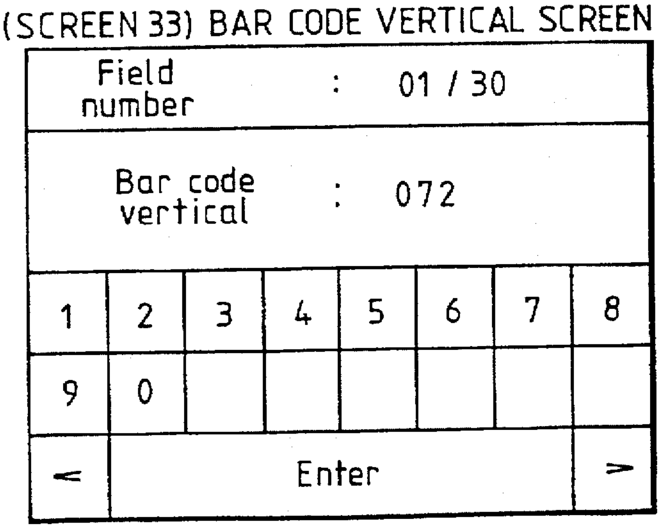
FIG. 54 shows a bar code vertical screen on the touch-screen unit of the invention.

Touching the Number of Digits area of the bar code field setting screen 30 causes the display of the number of print data digits entry screen 21, which is used to enter 13 digits (FIG. 42). Touching the Bar Scale Factor area of screen 30 brings up bar code scale factor screen 31, into which a bar scale factor of 2 is entered (FIG. 52). The Ratio area of screen 30 is touched to display bar code ratio screen 32 to enter 1 as the ratio (FIG. 53). The Direction area of screen 30 is touched to display print direction entry screen 24, which is used to select Forward (FIG. 45), and the Bar Vertical area of screen 30 is touched to display bar code vertical screen 33, which is used to enter a value of 072 (FIG. 54).

The Processing Setting area of screen 30 is touched to display processing condition setting screen 34, from which the C/D Calculation area is selected (FIG. 55), and when the Generate JAN 13 area of check, digit selection screen 35 is touched, the display reverts to the bar code field setting screen 30 (FIGS. 56 and 51).

The display moves to data specification selection screen 25 when the Data Specification area of bar code field setting screen 30 is touched (FIG. 46). When the Data area of screen 25 is touched, data block setting screen 26 is displayed (FIG. 47). When the Block 1 area of screen 26 is touched, the display shifts to initial data value setting screen 27 (FIG. 48). After using screen 27 to enter data number 02, starting digit 01 and number of data digits 07, the Enter area is touched to redisplay screen 26 (FIG. 47).

Selecting the Block 2 area in the data block setting screen 26 redisplays the initial data value setting screen 27 (FIG. 48). After using screen 27 to enter data number 03, number of data digits 05 and starting digit 01, touching the Enter area causes the display to revert to screen 26 (FIG. 47). When the End area of the data block setting screen 26 is touched, the display shifts to the bar code field setting screen 30 (FIG. 51). When the Enter area of screen 30 is touched, the display reverts back to field number setting screen 16 (FIG. 37).

After using field number setting screen 16 to enter field number 03, touching the Enter area shifts the display to bar code field setting screen 30 (FIG. 51). When the Print Type: Bar area of screen 30 is touched, print data type selection screen 28 is displayed (FIG. 49), and when the Character area is touched, the display shifts to character type selection screen 19 (FIG. 40). Selecting M Character in screen 19 causes the display to shift to character field setting screen 18 (FIG. 39).

The Print Position area of the screen 18 is touched to display the print position entry screen 20, which is used to set a vertical position of 0424 and a horizontal position of 232 (FIG. 41). The Number of Digits area of the character field setting screen 18 is touched to change the display to the number of print data digits screen 21. Screen 21 is used to enter 13 as the number of digits (FIG. 42), and the Pitch area of screen 18 is touched to change the display to the pitch entry screen 22, in which a character pitch of 1 is entered (FIG. 43). The Scale Factor area of the character field setting screen 18 is touched and a vertical scale factor of 1 and a horizontal scale factor of 1 are entered by character scale factor entry screen 23 (FIG. 44), and the Forward area of character field setting screen 18 is touched to display print direction entry screen 24 (FIG. 47) and to set the printing direction to forward.

When the Data Specification area of screen 18 is selected, the display changes to the data specification selection screen 25, on which the Copy area is touched followed by the Enter area, to display copy block setting screen 36 (FIG. 57). When block 1 is selected in this screen 36, the display moves to initial data value setting screen 27 (FIG. 48).

After field number 02, starting digit 01 and number of digits 13 have been entered by the initial data value setting screen 27 and the Enter area is touched, designating 491234567890 as the print data specified by field number 02, the display reverts to the copy block setting screen 36 (FIG. 57). When the End area of the copy, block setting screen 36 is touched, the character field setting screen 18 is displayed, and when the Enter area of that screen is touched, the display returns to the field number setting screen 16 (FIG. 37).

By selecting Format Number in the character field setting screen 18, the above print data parameters, destination number N and print field parameters are stored in a prescribed address in the SRAM 25 as a format number FM01 of data field parameter file 40, named FM01.DAT.

At the same time, the data parameters and destination number N are placed in the print data buffer space 36 of DRAM 26, as shown in FIG. 16.

The operation of the label printer 10 to print label 19, as shown in FIG. 10, is based on the print parameters thus set, and will now be described with reference to FIGS. 58 to 65.

Figure 58:
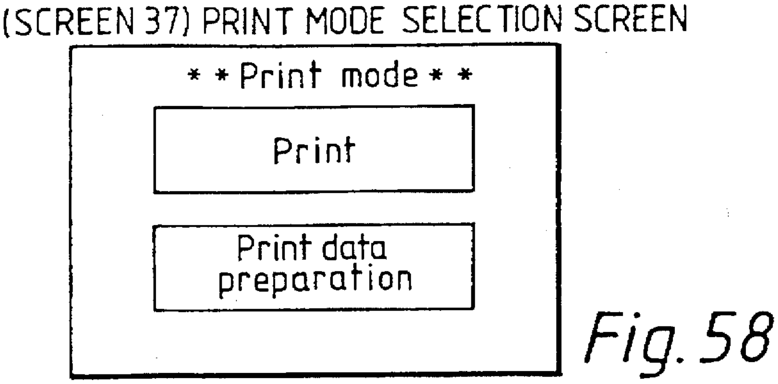
FIG. 58 shows a print mode selection screen on the touch-screen unit of the invention.
Figure 59:
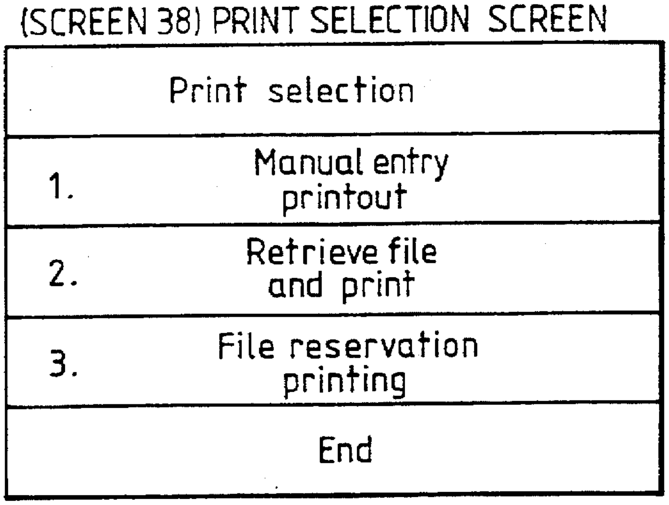
FIG. 59 shows a print selection screen on the touch-screen unit of the invention.
Figure 60:
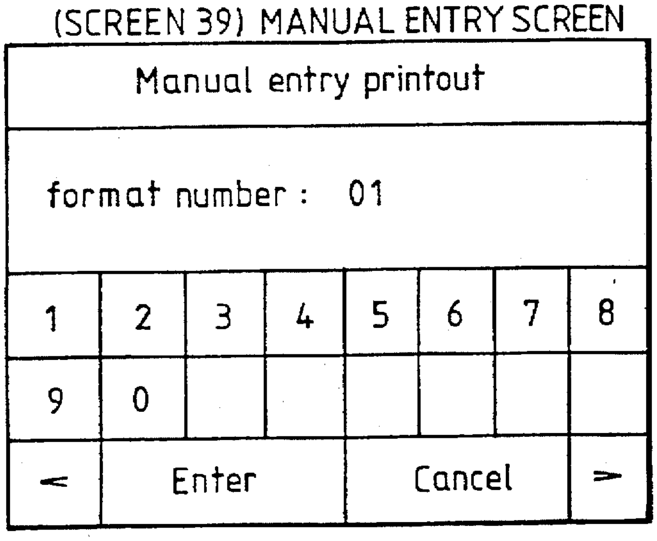
FIG. 60 shows a manual entry screen on the touch-screen unit of the invention.

When the printer system unit 11 power is switched on, print mode selection screen 37 is displayed on the touch-screen unit 13 under the control of the CPU 22 (FIG. 58). Selecting the Print area of the screen 37 displays print selection screen 38 (FIG. 59). When the Manual Entry Printing area is touched, the display shifts to manual entry printing screen 39 (FIG. 60).

When format number 01 is entered by the manual entry printing screen 39, the CPU 22 determines whether the data attribute of the data parameter number 01 in the data field parameter file 40 of format number 01 is an entry attribute or a fixed attribute. In this example it is set to entry, as shown in FIG. 9, thus data type is next determined.

Figure 61:
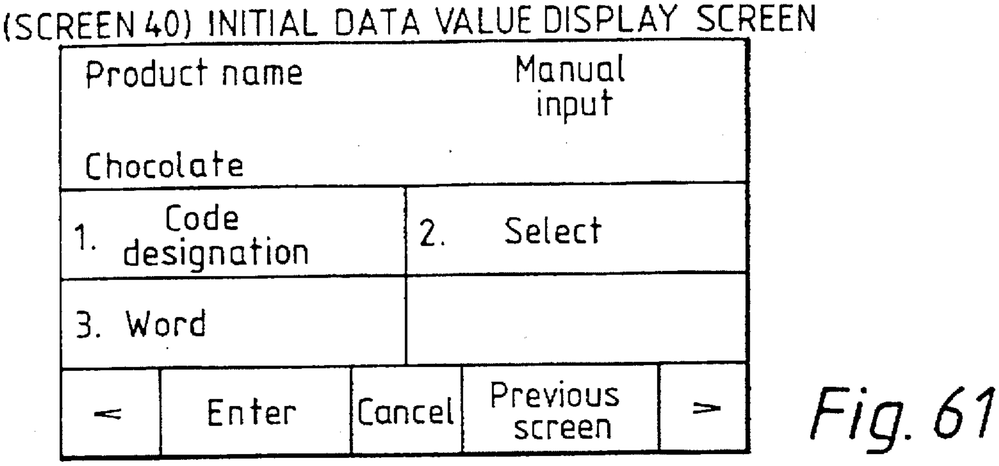
FIG. 61 shows an initial data value display screen on the touch-screen unit of the invention.

If the CPU 22 determines that the data type is Kanji, prescribed operation screen data stored in the ROM 24 is inputted to the touch-screen unit 13 to display initial data value display screen 40 (FIG. 61).

In the initial data value display screen 40, Product Name is displayed as the name and "chocolate" as the initial print data value.

Figure 62:
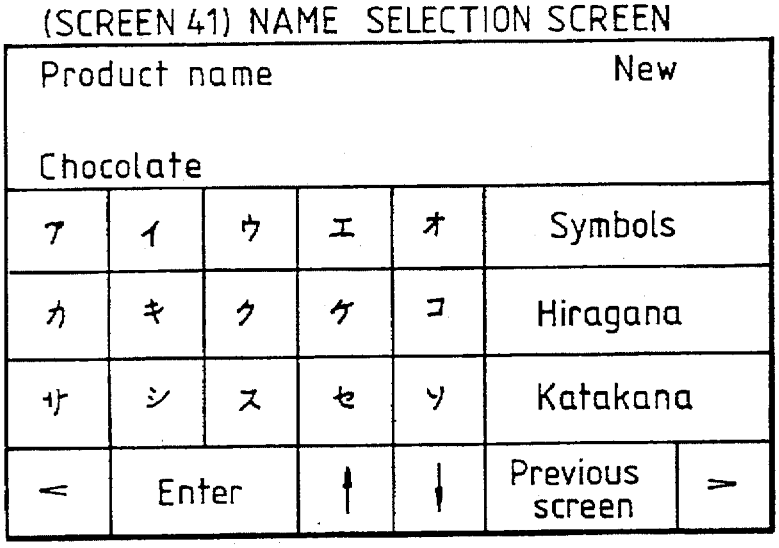
FIG. 62 shows a name selection screen on the touch-screen unit of the invention.
Figure 63:
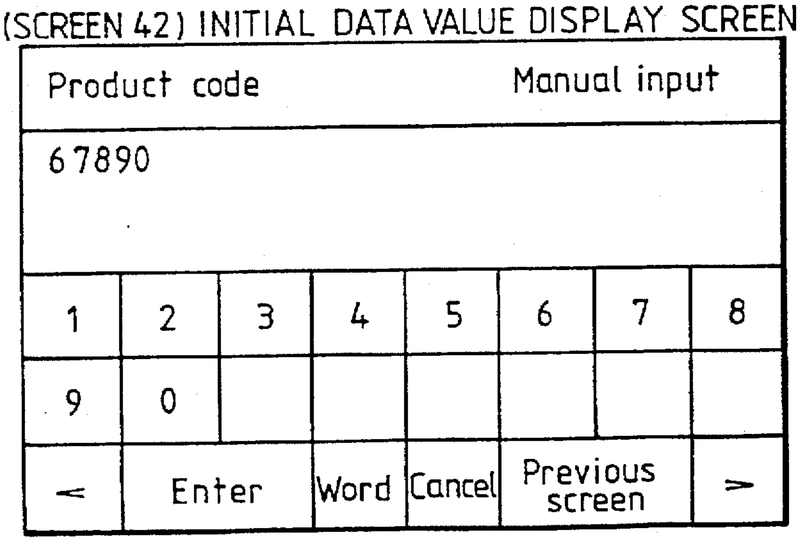
FIG. 63 shows an initial data value display screen on the touch-screen unit of the invention.

To change the initial print data value, the Name Selection area of the initial data value display screen 40 is touched, whereby the display changes to name selection screen 41 and the prescribed entry operation is implemented (FIG. 62). When the initial print data value "chocolate" is changed to "milk choco" (in katakana), for example, the initial print data value "chocolate" of the data number 01 in print data buffer space 36 of DRAM 26 is changed to "milk choco", making this "milk choco" the print data.

When the Enter area of the initial data value display screen 40 is touched when it is not necessary to change the initial print data value, the CPU 22 determines whether the data attribute of the data parameter number 02 in the data field parameter file 40 of format number 01 is an entry attribute or a fixed attribute. In this case it is set to fixed, as shown in FIG. 9, so the CPU 22 next determines whether the data attribute of the data parameter number 03 in the data field parameter file 40 of foremat number 01 is an entry attribute or a fixed attribute. As shown in FIG. 9, in this case it is set to Entry, so next the data type is determined.

If the CPU 22 determines that the data type is Number, prescribed operation screen data stored in the ROM 24 is output to the touch-screen unit 13 to display initial data value display screen 42 (FIG. 63), in which Product Code is displayed as the name and 67890 as the initial data value.

Figure 64:
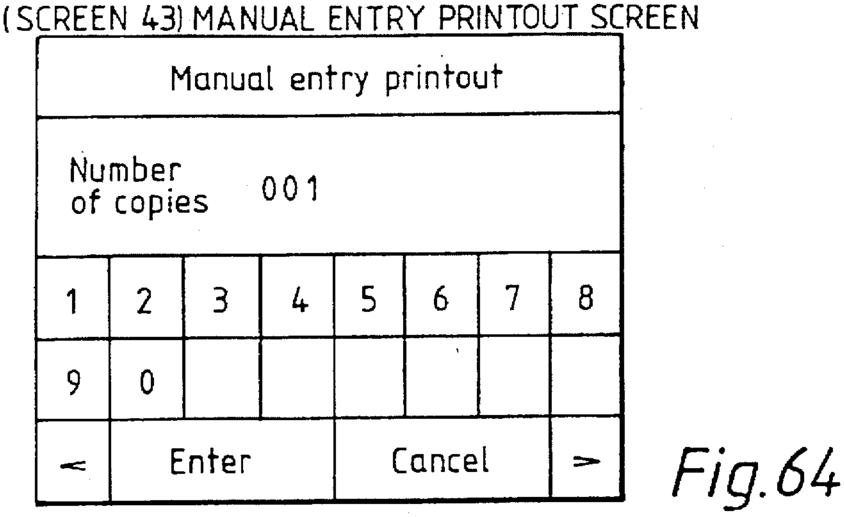
FIG. 64 shows a manual entry printing screen on the touch-screen unit of the invention.
Figure 65:
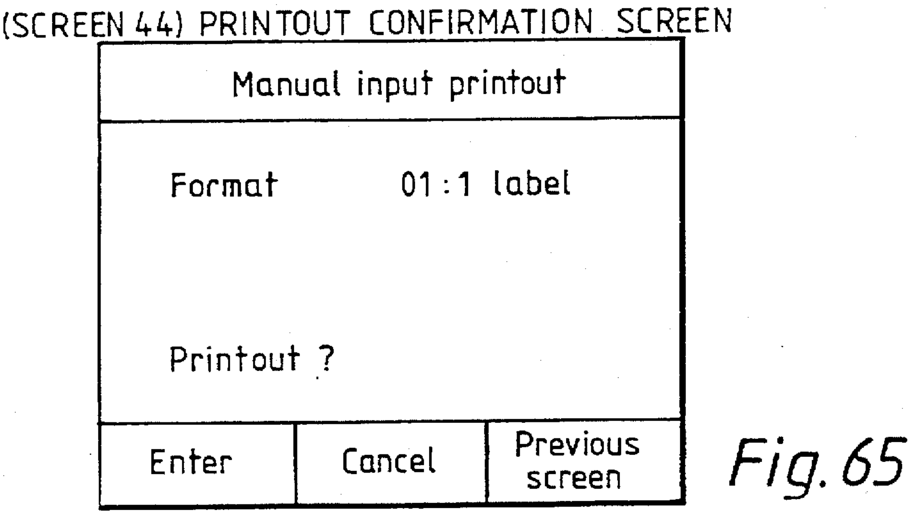
FIG. 65 shows a printout confirmation screen on the touch-screen unit of the invention.

This initial print data value 67890 can be changed by touching the screen 42 to input the required numerical values. The initial print data value thus changed becomes the print data stored in the data number 03 print data buffer space 36 of DRAM 26. When the Enter area of the initial data value display screen 42 is touched when it is not necessary to alter the initial print data value 67890, the CPU 22 determines whether the above data number 03 is the final number. In this case it is the final number in the data parameter of FIG. 9, so the next operation screen is displayed, which is manual entry printing screen 43 (FIG. 64). Screen 43 is used to input 1 as the number of labels 19 to be printed. When the Enter area is touched in screen 43, the CPU 22 displays printout confirmation screen 44 (FIG. 65).

When the Enter area of printout confirmation screen 44 is touched, the CPU 22 develops the print data of print numbers 01 to 03 stored in the print data buffer space 36 of the DRAM 26 and in the image editing parameter preparation space 37 of the DRAM 26 to generate image editing parameters. The image editing parameters are in a pattern specified by the field parameters set in print field parameter space 43 of the format number 01 of data field parameter file 40 stored in the SRAM 25. The CPU 22 then develops these image editing parameters in the image editing space 38 of DRAM 26 to produce print image data. The CPU 22 also supplies this print image data to the thermal print head 15 in the printer section 28 and operates the stepping motor 32 to turn the platen roller 16, resulting in the print out of one label 19 (FIG. 10).

The operation to print out the label 19A, shown in FIG. 18, after printing out the label 19 of FIG. 10 is subsequently explained. The operation to print label 19A is performed using the operation screen jump table function which is a principal constituent of the present invention.

Figure 66:
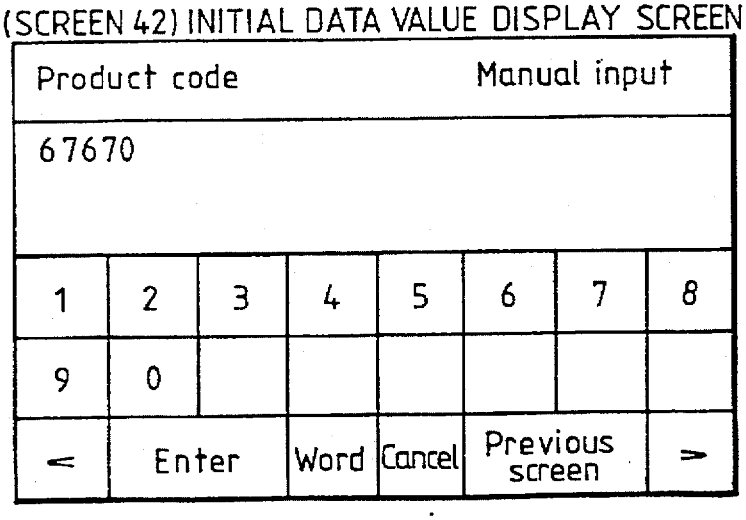
FIG. 66 shows an initial data value display screen on the touch-screen unit of the invention.
Figure 67:
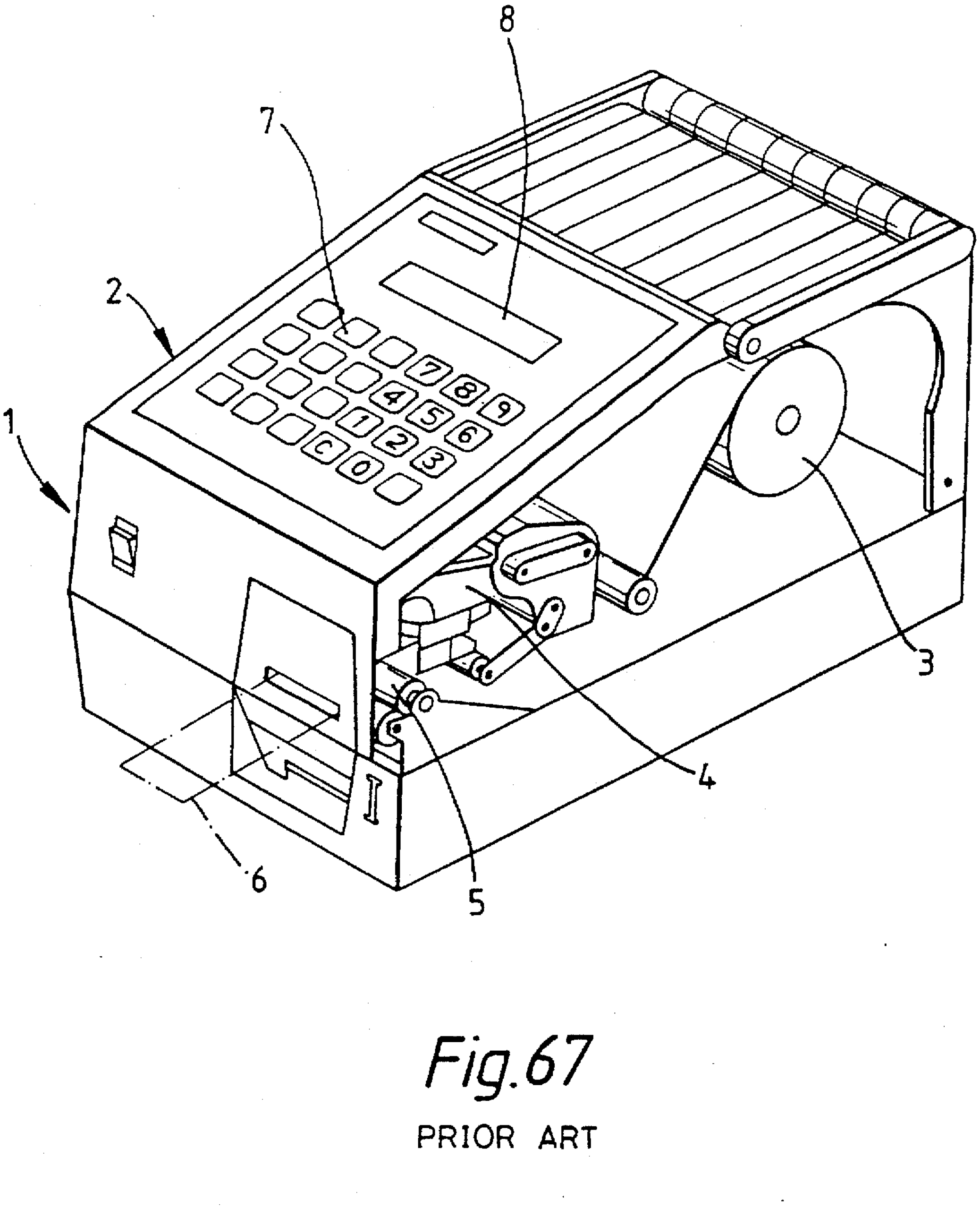
Fig.67 PRIOR ART
FIG. 67 is a partially cutaway external perspective view of a conventional label printer.

After label 19 has been printed, the CPU 22 functions to read out destination number N in the print data buffer space 36 of DRAM 26. At this point, as shown in FIG. 16, the destination number N is 3, so the CPU 22 reads out the process address LCD04 corresponding to data number 03 in the jump table 35 generated in the program space 33 of DRAM 26 (FIG. 20). Along with reading out the address LCD04, the program stored in ROM 24 address LCD04 is executed, displaying the initial data value display screen 42 shown in FIG. 63 on the touch-screen unit 13. Since the screen 42 displays the product code 67890 that is the initial print data value of the label 19, by entering the product code of the label 19A which, as shown in FIG. 66, is 67670, and by touching the Enter key, the initial print data value of print data buffer space 36 of data number 03 is changed to 67670, as shown in FIG. 17.

When the label 19 is printed, the initial print data values of the print data numbers 01 and 02, "chocolate" and 4912345, are maintained in print data buffer space 36. At the same time, when the Enter key of the initial data value display screen 42 is touched, the CPU 22 determines whether the data number 03 is the final number. In the print data buffer space 36 of FIG. 17, it is the final number, so the next operation screen is displayed, which is manual entry printing screen 43 (FIG. 64). Screen 43 is used to input 1 as the number of labels 19A to be printed. When the Enter area is then touched, the CPU 22 displays printout confirmation screen 44 (FIG. 65).

When the Enter area of the printout confirmation screen 44 is touched, the CPU 22 develops the print data of print numbers 01 to 03 stored in the print data buffer space 36 of the DRAM 26 in the image editing parameter preparation space 37 of the DRAM 26. This generates image editing parameters in a pattern specified by the field parameters set in print field parameter space 43 of the format number 01 of data field parameter file 40, which is stored in the SRAM 25. The CPU 22 then develops these image editing parameters in the image editing space 38 of DRAM 26 to produce print image data. The CPU 22 also supplies this print image data to the thermal print head 15 in the printer section 28 and operates the stepping motor 32 to turn the platen roller 16, which results in the printing of one label 19A (FIG. 18).

With the label printer 10 arranged according to the above configuration, with respect to the entering of print data parameters by the touch-screen unit 13, when a label has been printed and another label or labels are to be printed having the same kind of print data, by entering the destination number N beforehand it is not necessary to display all the operation screens in order. Instead, the process jumps to the display of the operation screen for the print data specified by the destination number N, allowing the entering of the print data to proceed from that screen. This thereby eliminates having to repeatedly enter the print data items, and thus markedly improves the efficiency of the print data entry operation. Jumping to a required operation screen is also simplified, requiring only the entry of the destination number N by means of the touch-screen unit 13.

Although in the embodiment described the printer system unit 11 and the touch-screen unit 13 are separate units connected by the interface cable 12, it is to be understood that this invention is not limited to that arrangement, and that the touch-screen unit 13 and printer system unit 11 can be provided as a single integrated unit.

Also, although the above embodiment is described with reference to the use of 3 as the destination number N following the printing of a label, to jump to the display of the product code entry screen, this is a limitation of the present invention. Instead, any destination number may be used. Thus, by setting a value of 03 or above as the data number in the print data parameter space 41 and specifying this value as destination number N, it is possible to jump to a prescribed entry screen designated by this destination number N. The present invention is also not limited to setting the product code 67890 as the initial print data value parameter in the initial data value parameter setting space 39 of data number 03. Instead, anything may be set as the parameter, such as product price, for example, with the arrangement being such that after a label is printed, the display jumps to this product price entry screen, and any other changes may be made to the configuration.

In accordance with the present invention, a label printer is provided that enables print data information for setting the desired content of data printed on a label, and print data editing information for printing the label data at a prescribed position and in a prescribed format, to be entered by operation screens. The operation screens are displayed hierarchically on a touch-screen device provided on the label printer. The print data can be entered starting from any desired operation screen, thereby eliminating the need to repeat the entry of data starting from the first screen, when printing out labels in which some data is repeated.

I claim:

1. A label printer in which print data is printed on a label, the label printer comprising:

a printer system unit and a touch-screen unit electrically connected to the printer system unit, with print data setting information for setting prescribed content of label print data and print data editing information for printing the print data on the label in a prescribed format being capable of being entered by operating touch screens hierarchically displayed on the touch-screen unit, data input means displaying print data setting information on a screen of the touch-screen unit and making a data input possible, designation input means designating a treatment address for reading out print data setting information to be displayed subsequent to displaying input data setting information on a screen, display means displaying on a screen a designated print data setting information in accordance with the input from the designation input means;

and an operation screen at any level in the hierarchical structure can be displayed on the touch-screen and print data setting information inputted from that level.

2. A label printer, comprising:

a label printer system unit for generating print data on a label; and a screen unit electrically connected to the label printer system unit, and for entering print data setting information for prescribing content of the print data, and for entering print data editing information for prescribing format of the print data on the label, data input means displaying print data setting information on a screen of the screen unit and making a data input possible, designation input means designating a treatment address for reading out print data setting information to be displayed subsequent to displaying input data setting information on a screen, display means displaying on a screen a designated print data setting information in accordance with the input from the designation input means, the screen unit adapted for hierarchical display of operating screens with print data setting information capable of being inputted by an operation screen at any level of the hierarchical structure.

3. The label printer according to claim 2 further comprising an interface cable connecting the label printer system unit and the screen unit.

4. The label printer according to claim 2 wherein the screen unit is a touch-screen unit adapted to display touch screens.

5. The label printer according to claim 4 wherein the touch-screen unit includes a liquid crystal display for displaying touch-screens, and a transparent touch-panel in close proximity with a surface of the liquid crystal display, with the operating screen being hierarchically displayed on the liquid crystal display.

6. The label printer according to claim 2 wherein the label printer system unit includes a thermal print head and a platen roller which cooperate to effect printing of print data on a label.

7. The label printer according to claim 2 including an electrical circuit, comprising:

a read-only memory ("ROM") having an operating program which provides overall control of the label printer;

a first memory for storing data;

a second memory;

a video random-access memory ("VRAM");

a printer section;

a central processing unit ("CPU"); and a bus connecting the ROM, first memory, second memory, VRAM and printer section to the CPU.

8. The label printer according to claim 7 wherein the first memory is a static random-access memory ("SRAM") for storing data, wherein the data is print data, print data parameters, or print data editing parameters.

9. The label printer according to claim 7 wherein the second memory is a dynamic random-access memory ("DRAM").

10. The label printer according to claim 7 wherein the printer section comprises:

a printer head control circuit connected to the bus;

a thermal print head connected to the printer head control circuit;

a stepping motor drive circuit connected to the bus;

a stepping motor connected to the stepping motor drive circuit; and a platen roller connected to the stepping motor.

11. The label printer according to claim 7 wherein the ROM stores operation screen data and the VRAM generates the operation screen data into operation screen image data.

12. The label printer according to claim 11, further comprising a touch-screen control section connected to the VRAM and the screen unit under the control of the CPU, the operation screen image data is displayed, by the touch screen control section, on the screen unit as sequences of operation screens.

13. The label printer according to claim 7, wherein the first memory has stored therein data field parameter files, each data field parameter file including print data parameters designating print data information, a destination number setting for determining the destination number N that designates a hierarchical level of the operation screen displayed when a next print data is inputted from the screen unit, and print field parameters designating print data editing information.

14. A method of operating a label printer having a printer system unit for printing a label, and a screen unit connected to and for operating the printer system unit, the method comprising the steps of:

operating a data parameter setting screen on the screen unit for setting parameters for printing of a label;

operating a field parameter setting screen on the screen unit for setting print field parameters for printing of a label;

operating a print mode screen on the screen unit;

providing a data input means displaying print data setting information on a screen of the screen unit and making a data input possible;

providing a designation input means designating a treatment address for reading out print data setting information to be displayed subsequent to displaying input data setting information on a screen;

providing display means displaying on a screen a designated print data setting information in accordance with the input from the designation input means, and printing of one or more labels.

15. A method of operating a label printer having a printer system unit for printing a label, and a screen unit connected to and for operating the printer system unit, the method comprising the steps of:

operating a data parameter setting screen on the screen unit for setting parameters for printing of a label;

operating a field parameter setting screen on the screen unit for setting print field parameters for printing of a label;

operating a print mode screen on the screen unit;

providing a data input means displaying print data setting information on a screen of the screen unit and making a data input possible;

providing a designation input means designating a treatment address for reading out print data setting information to be displayed subsequent to displaying input data setting information on a screen;

providing display means displaying on a screen a designated print data setting information in accordance with the input from the designation input means, and operating one or more additional screens on the screen unit and at completion of such operation printing one or more labels.

16. The method of claim 15 wherein the screens on the screen unit are operated by touching designated areas of the screens.

* * * * *